United States Patent
Sharoni et al.

(10) Patent No.: US 10,503,526 B2
(45) Date of Patent: Dec. 10, 2019

(54) METHOD AND SYSTEM FOR USER EXPERIENCE EVENT PROCESSING AND ANALYSIS

(71) Applicant: Western Digital Technologies, Inc., Irvine, CA (US)

(72) Inventors: Liran Sharoni, Kfar Saba (IL); Ido Shilo, Kfar Saba (IL); Miki Sapir, Nes Ziona (IL); Alon Marcu, Tel Mond (IL)

(73) Assignee: Western Digital Technologies, Inc., Irvine, CA (US)

( * ) Notice: Subject to any disclaimer, the term of this patent is extended or adjusted under 35 U.S.C. 154(b) by 74 days.

(21) Appl. No.: 15/621,460

(22) Filed: Jun. 13, 2017

(65) Prior Publication Data
US 2018/0357074 A1    Dec. 13, 2018

(51) Int. Cl.
*G06F 9/451*     (2018.01)
*H04N 5/77*     (2006.01)
(Continued)

(52) U.S. Cl.
CPC .......... *G06F 9/451* (2018.02); *G06F 11/3438* (2013.01); *G06F 11/3466* (2013.01);
(Continued)

(58) Field of Classification Search
CPC ....... G06F 9/451; G06F 3/0482; G06T 11/226
See application file for complete search history.

(56) References Cited

U.S. PATENT DOCUMENTS 6,006,016 A * 12/1999 Faigon ................ G06F 11/2252
714/26
6,115,393 A *  9/2000 Engel .................. H04L 41/0213
370/469
(Continued)

FOREIGN PATENT DOCUMENTS

EP             2731015 A2    5/2014
WO    WO 2012/075526 A2    6/2012
(Continued)

OTHER PUBLICATIONS

Application as Filed in U.S. Appl. No. 15/621,476, filed Jun. 13, 2017, 59 pages.
(Continued)

*Primary Examiner* — Phenuel S Salomon
(74) *Attorney, Agent, or Firm* — Brinks Gilson & Lione

(57) ABSTRACT

A method and system for user experience event processing and analysis are provided. In one embodiment, a computing device correlates detected pre-defined user experience events with data indicating activity of a storage device over a time period and generates an analysis of the correlation. In another embodiment, a computing device compares first and second recorded videos to identify differences, wherein the first and second recorded videos are synchronized based on content rather than time, correlates the differences with the data indicating activity of a storage device of a host device, and generates an analysis of the correlation. Other embodiments are possible, and each of the embodiments can be used alone or together in combination.

20 Claims, 24 Drawing Sheets
(18 of 24 Drawing Sheet(s) Filed in Color)

(51) Int. Cl.
*G06K 9/00* (2006.01)
*G11B 27/34* (2006.01)
*G06F 11/34* (2006.01)
*G06T 11/20* (2006.01)
*G06F 11/30* (2006.01)

(52) U.S. Cl.
CPC .......... *G06K 9/00718* (2013.01); *G11B 27/34* (2013.01); *H04N 5/77* (2013.01); *G06F 11/3034* (2013.01); *G06F 11/3485* (2013.01); *G06F 2201/86* (2013.01); *G06K 2009/00738* (2013.01); *G06T 11/206* (2013.01)

(56) References Cited

U.S. PATENT DOCUMENTS

| | | | |
|---|---|---|---|
| 6,374,251 B1* | 4/2002 | Fayyad | G06F 16/35 |
| 8,271,618 B1 | 9/2012 | Kridlo | |
| 9,294,710 B2* | 3/2016 | Lim | H04N 5/781 |
| 2002/0144277 A1* | 10/2002 | Friedman | G11C 7/16 |
| | | | 725/89 |
| 2007/0083813 A1* | 4/2007 | Lui | G06F 11/3612 |
| | | | 715/709 |
| 2007/0168915 A1* | 7/2007 | Fabbio | G06F 11/0709 |
| | | | 717/101 |
| 2007/0237227 A1* | 10/2007 | Yang | H04N 17/004 |
| | | | 375/240.12 |
| 2008/0195369 A1* | 8/2008 | Duyanovich | G06F 11/0709 |
| | | | 703/22 |
| 2009/0083710 A1* | 3/2009 | Best | G09B 5/00 |
| | | | 717/120 |
| 2009/0136210 A1* | 5/2009 | Morimoto | G11B 27/034 |
| | | | 386/241 |
| 2009/0287791 A1 | 11/2009 | Mackey | |
| 2014/0075371 A1 | 3/2014 | Carmi | |
| 2014/0133692 A1* | 5/2014 | Spata | G06F 11/3476 |
| | | | 382/100 |
| 2015/0177994 A1 | 6/2015 | Vucinic et al. | |
| 2015/0215245 A1 | 7/2015 | Carlson et al. | |
| 2015/0262556 A1 | 9/2015 | Edwall et al. | |
| 2017/0083585 A1* | 3/2017 | Chen | G06F 17/30554 |
| 2017/0109004 A1 | 4/2017 | Ghosh et al. | |
| 2017/0371968 A1 | 12/2017 | Horowitz et al. | |

FOREIGN PATENT DOCUMENTS

| | | | |
|---|---|---|---|
| WO | WO 2014/166523 A1 | 10/2014 | |
| WO | WO 2015/174976 A1 | 11/2015 | |

OTHER PUBLICATIONS

Application as Filed in U.S. Appl. No. 15/226,661, filed Aug. 2, 2016, 28 pages.
Non-Final Office Action from U.S. Appl. No. 15/621,476, dated Mar. 27, 2018, 14 pages.
Office Action and list of references, in U.S. Appl. No. 15/226,661, dated Jul. 10, 2018, pp. 1-28.
International Search Report and Written Opinion for Application No. PCT/US2018/019521 dated Jun. 26, 2018, pp. 1-15.
International Search Report and Written Opinion in Application No. PCT/US2018/019525 dated Jun. 26, 2018, pp. 1-16.
Notice of Allowance from U.S. Appl. No. 15/621,476, dated Jul. 26, 2018, pp. 1-7.

* cited by examiner

App Icon

App Ready
Images

METHOD AND SYSTEM FOR USER EXPERIENCE EVENT PROCESSING AND ANALYSIS

BACKGROUND

Today's mobile platforms (e.g., a phone, tablet, or wearable device) are complicated systems containing many elements, both hardware and software. One such element is a storage system (either embedded or removable) that is used for data storage and retrieval. The typical design process of storage systems for these platforms typically considers only inner measurements of the storage chip to be relevant, with little regard for the user experience (UX) at the end of a long chain of potential bottlenecks that may or may not be related to the storage performance. User experience is affected strongly, for example, by time lags that are seen on the mobile device's graphical user interface (GUI) as black regions before they are filled with content. In the past, the user experience measurements on mobile platforms were conducted manually, with a person observing a test scenario displayed on the mobile device's graphical user interface to determine if there was a visible lag.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE PRESENTLY PREFERRED EMBODIMENTS

Overview

Figure 1A:
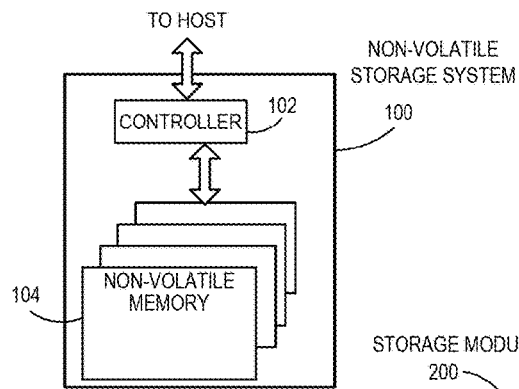
FIG. 1A is a block diagram of a non-volatile storage system of an embodiment.

By way of introduction, the below embodiments relate to a method and system for user experience event processing and analysis. In one embodiment, a method is provided for analyzing user experience events. The method is performed in a computing device in communication with a host device, wherein the host device comprises a storage device. The method comprises receiving a recorded video of a graphical user interface of the host device over a time period; receiving data indicating activity of the storage device over the time period, wherein the data is synchronized with the recorded video; detecting pre-defined user experience events in the recorded video; correlating the detected pre-defined user experience events with the data indicating activity of the storage device over the time period; and generating an analysis of the correlation.

In some embodiments, the video of the graphical user interface of the host device is recorded using a camera external to the host device.

In some embodiments, the video of the graphical user interface of the host device is recorded using an application running on the host device.

In some embodiments, the pre-defined user experience events are detected using an image processing algorithm and a pre-defined template database (i.e., one or more pre-defined templates).

In some embodiments, the analysis comprises a report.

In some embodiments, the analysis comprises a graph.

In some embodiments, an application on the host device synchronizes the data indicating activity of the storage device with the recorded video by writing a time stamp of when the recording started into a log in a file containing the data indicating activity of the storage device.

In some embodiments, the method further comprises filtering the video to account for one or more of the following: video compression and quality degradation.

In some embodiments, the pre-defined user experience events relate to one or more of the following: an application launch/application ready, a photo album load, a screen swipe, a start/end of an application installation, and a start or end of a camera burst of photos.

In some embodiments, the storage device comprises a three-dimensional memory.

In another embodiment, a system is provided comprising: an event detector configured to detect user experience events in a recorded video of a graphical user interface of a host device over a time period; a database generator (i.e., a reference image generator) configure to create a reference image database (i.e., one or more reference images) for the event detector to use to detect the user experience events in the recorded video, and an analyzer configured to correlate the detected user experience events with traces of activity of a storage device in the host device over the time period and generate an analysis of the correlation.

In some embodiments, the video of the graphical user interface of the host device is recorded using a camera external to the host device.

In some embodiments, the video of the graphical user interface of the host device is recorded using an application running on the host device.

In some embodiments, the event detector uses an image processing algorithm.

In some embodiments, the analysis comprises a report.

In some embodiments, the analysis comprises a graph.

In some embodiments, an application on the host device synchronizes the traces with the recorded video by writing a time stamp of when recording started into log in a tracer file.

In some embodiments, the event detector is further configured to filter the video to account for one or both of video compression and quality degradation.

In some embodiments, the user experience events relate to one or more of the following: an application launch/application ready, a photo album load, a screen swipe, a start/end of an application installation, and a start or end of a camera burst of photos.

In some embodiments, the storage device comprises a three-dimensional memory.

In another embodiment, a system is provided comprising means for receiving a recorded video of a graphical user interface of a host device over a time period; means for receiving data indicating activity of a storage device of the host device over the time period, wherein the data is synchronized with the recorded video; means for detecting pre-defined user experience events in the recorded video; means for correlating the detected pre-defined user experience events with the data indicating activity of the storage device over the time period; and means for generating an analysis of the correlation.

In some embodiments, the storage device comprises a three-dimensional memory.

In another embodiment, a method for analyzing user experience events is provided. The method is performed in a computing device in communication with a host device. The method comprises receiving a recorded video of a display of the host device and a reference video; comparing the recorded video of the display of the host device with the reference video to identify differences, wherein the recorded video of the display of the host device and the reference video are synchronized based on content rather than time; receiving data indicating activity of a storage device of the host device; correlating the differences with the data indicating activity of the storage device; and generating an analysis of the correlation.

In some embodiments, the differences are dropped frames.

In some embodiments, the differences are duplicate frames.

In some embodiments, the video of the display of the host device is recorded using a camera.

In some embodiments, the video of the display of the host device is recorded using an application in the host device.

In some embodiments, the analysis comprises at least one of a report and a graph.

In some embodiments, the recorded video of the display of the host device is synchronized with the reference video based on content rather than time by separating the two videos into frames, numbering each frame, and then rebuilding the numbered frames into new videos.

In some embodiments, the method further comprises filtering the video of the display of the host device to account for one or more of the following: video compression and quality degradation.

In some embodiments, the storage device comprises a three-dimensional memory.

In another embodiment, a system is provided comprising a storage device configured to store a recorded video of a display of a host device, a reference video, and data indicating activity of a storage device of the host device; and a visualizer module configured to compare the recorded video of the display of the host device and the reference video to identify differences, correlate the differences with the data indicating activity of the storage device, and generate an analysis of the correlation, wherein the video of the display of the host device and the reference video are synchronized based on content rather than time.

In some embodiments, the differences are dropped frames.

In some embodiments, the differences are duplicate frames.

In some embodiments, the video of the display of the host device is recorded using a camera.

In some embodiments, the video of the display of the host device is recorded using an application on the host device.

In some embodiments, the analysis comprises at least one of a report and a graph.

In some embodiments, the recorded video of the display of the host device is synchronized with the reference video based on content rather than time by separating the two videos into frames, numbering each frame, and then rebuilding the numbered frames into new videos.

In some embodiments, the system further comprises an image processing module configured to filter at least one of the first and second video to account for one or more of the following: video compression and quality degradation.

In some embodiments, the storage device of at least one of the first and second host device comprises a three-dimensional memory.

In another embodiment, a system is provided comprising means for receiving a recorded video of a display of the host device and a reference video; means for comparing the recorded video of the display of the host device with the reference video to identify differences, wherein the recorded video of the display of the host device and the reference video are synchronized based on content rather than time; means for receiving data indicating activity of a storage device of the host device; means for correlating the differences with the data indicating activity of the storage device; and means for generating an analysis of the correlation.

In some embodiments, the storage device comprises a three-dimensional memory.

Other embodiments are possible, and each of the embodiments can be used alone or together in combination. Accordingly, various embodiments will now be described with reference to the attached drawings.

Exemplary Embodiments

Figure 1B:
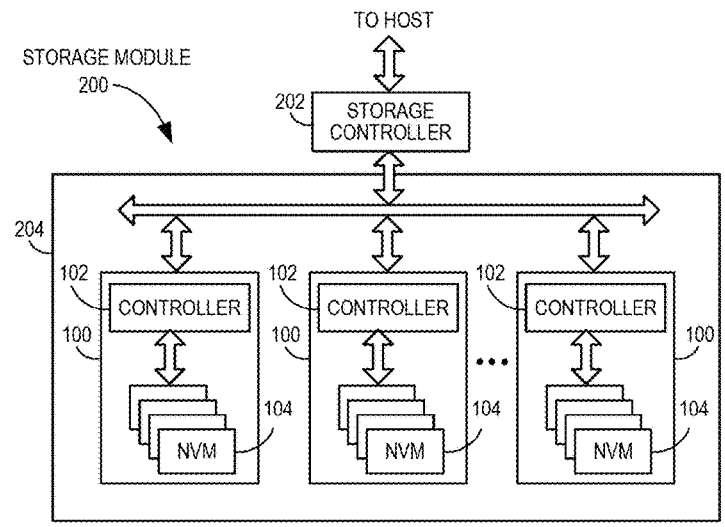
FIG. 1B is a block diagram illustrating an exemplary storage module of an embodiment.
Figure 1C:
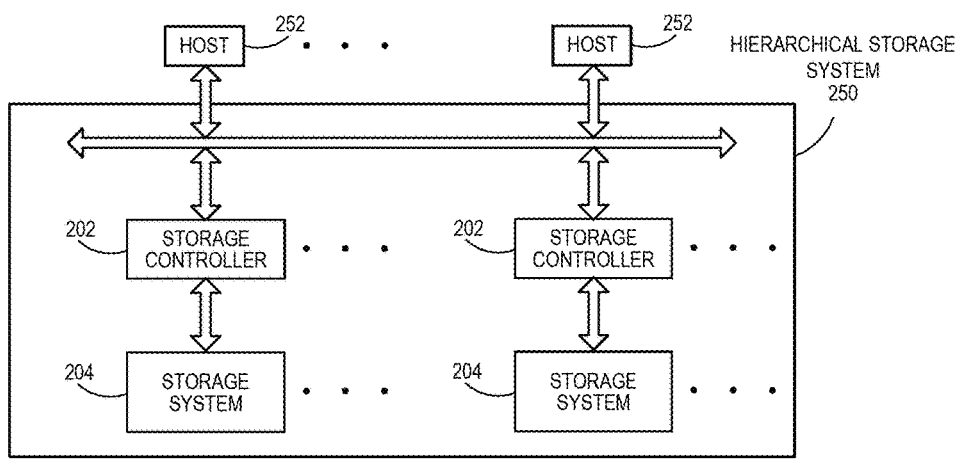
FIG. 1C is a block diagram illustrating a hierarchical storage system of an embodiment.

The following embodiments can be implemented in any suitable type of digital data storage system (sometimes referred to herein as a storage device), including solid-state (e.g., flash memory) storage systems, as well as hard drives. Accordingly, although a solid-state storage system will be used to illustrate the below examples, it should be understood that these embodiments can be implemented using a hard drive or other type of storage system. Accordingly, the use of a solid-state storage system should not be read into the claims, unless expressly recited therein. Solid-state memory systems suitable for use in implementing aspects of these embodiments are shown in FIGS. 1A-1C. FIG. 1A is a block diagram illustrating a non-volatile memory system 100 according to an embodiment of the subject matter described herein. Referring to FIG. 1A, non-volatile memory system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a flash memory controller) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a flash memory controller is a device that manages data stored on flash memory and communicates with a host, such as a computer or electronic device. A flash memory controller can have various functionality in addition to the specific functionality described herein. For example, the flash memory controller can format the flash memory to ensure the memory is operating properly, map out bad flash memory cells, and allocate spare cells to be substituted for future failed cells. Some part of the spare cells can be used to hold firmware to operate the flash memory controller and implement other features. In operation, when a host needs to read data from or write data to the flash memory, it will communicate with the flash memory controller. If the host provides a logical address to which data is to be read/written, the flash memory controller can convert the logical address received from the host to a physical address in the flash memory. (Alternatively, the host can provide the physical address.) The flash memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, memory system 100 may be a card based system, such as a secure digital (SD) or a micro secure digital (micro-SD) card. In an alternate embodiment, memory system 100 may be part of an embedded memory system.

Although, in the example illustrated in FIG. 1A, non-volatile memory system 100 (sometimes referred to herein as a storage module) includes a single channel between controller 102 and non-volatile memory die 104, the subject matter described herein is not limited to having a single memory channel. For example, in some NAND memory system architectures (such as the ones shown in FIGS. 1B and 1C), 2, 4, 8 or more NAND channels may exist between the controller and the NAND memory device, depending on controller capabilities. In any of the embodiments described herein, more than a single channel may exist between the controller and the memory die, even if a single channel is shown in the drawings.

FIG. 1B illustrates a storage module 200 that includes plural non-volatile memory systems 100. As such, storage module 200 may include a storage controller 202 that interfaces with a host and with storage system 204, which includes a plurality of non-volatile memory systems 100. The interface between storage controller 202 and non-volatile memory systems 100 may be a bus interface, such as a serial advanced technology attachment (SATA) or peripheral component interface express (PCIe) interface. Storage module 200, in one embodiment, may be a solid state drive (SSD), such as found in portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be an NVMe or fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
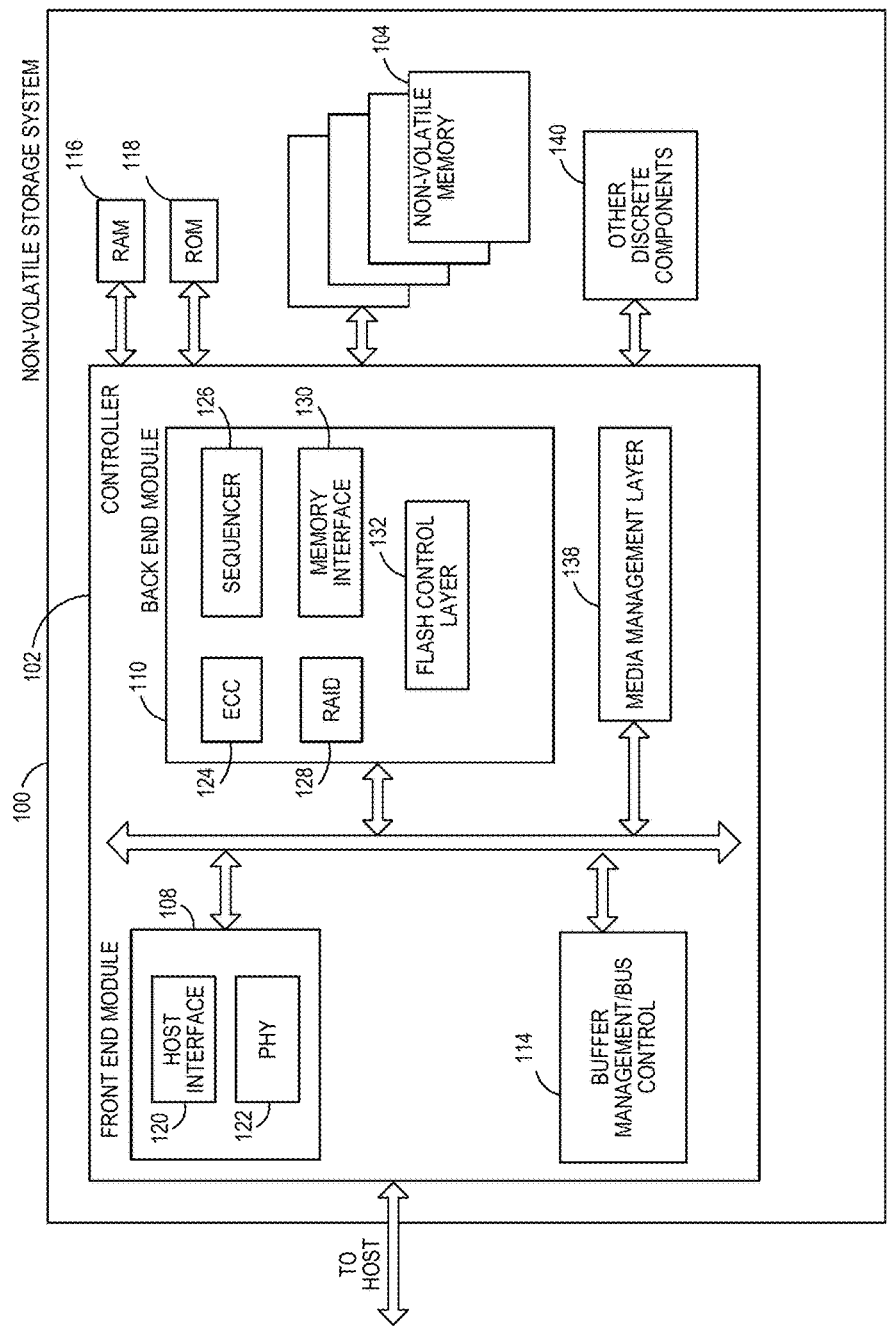
FIG. 2A is a block diagram illustrating exemplary components of the controller of the non-volatile storage system illustrated in FIG. 1A according to an embodiment.

FIG. 2A is a block diagram illustrating exemplary components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, SAS, Fibre Channel, USB, PCIe, and NVMe. The host interface 120 typically facilitates transfer for data, control signals, and timing signals.

Back end module 110 includes an error correction controller (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

Additional components of system 100 illustrated in FIG. 2A include a tracer 111, which will be discussed in more detail below. In general, a module (including the tracer 111) of the system 100, can be implemented by dedicated hardware formed as part of the memory controller 102 (which may be an Application Specific Integrated Circuit, or ASIC), implemented through software or firmware in the memory controller 102, or implemented through a combination of hardware and software.

The memory system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
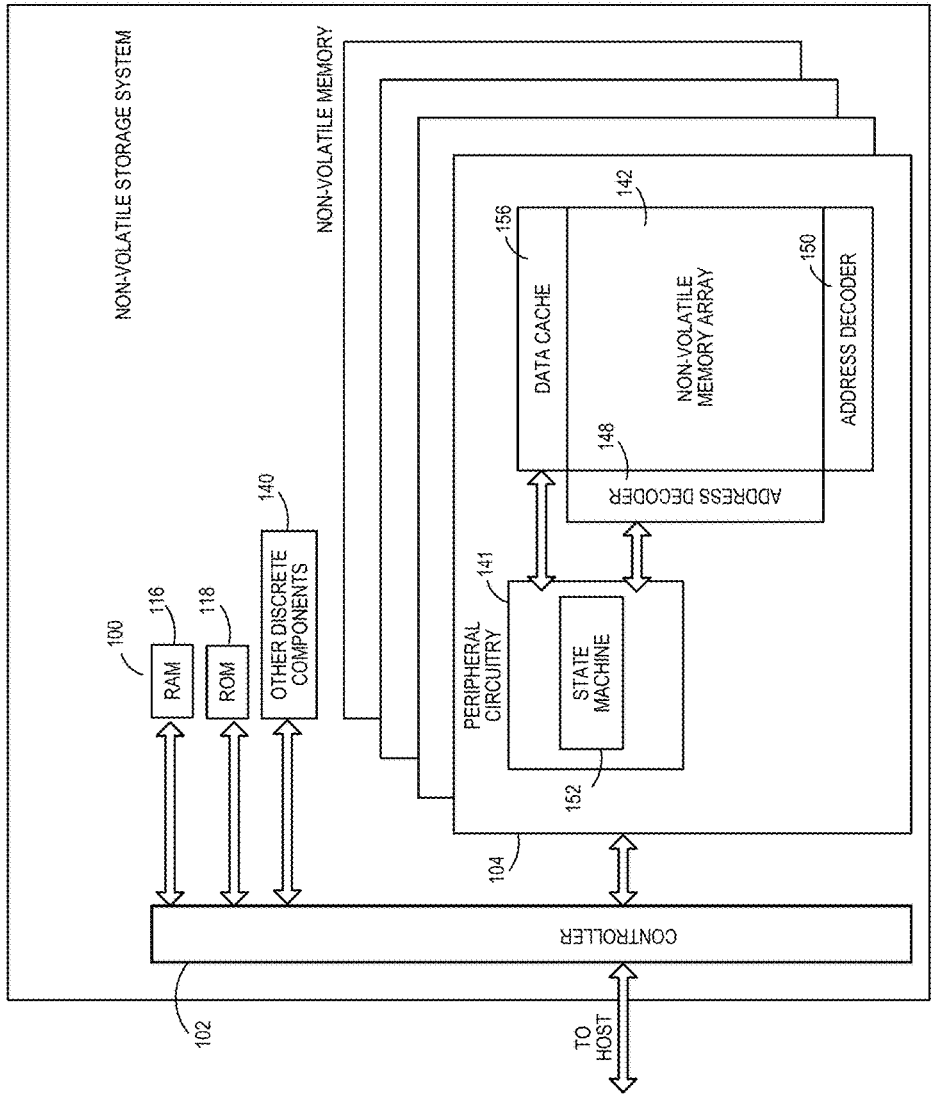
FIG. 2B is a block diagram illustrating exemplary components of the non-volatile memory storage system illustrated in FIG. 1A according to an embodiment.

FIG. 2B is a block diagram illustrating exemplary components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including NAND flash memory cells and/or NOR flash memory cells in a two dimensional and/or three dimensional configuration. Peripheral circuitry 141 includes a state machine 152 that provides status information to controller 102. Non-volatile memory die 104 further includes a data cache 156 that caches data.

Figure 3:
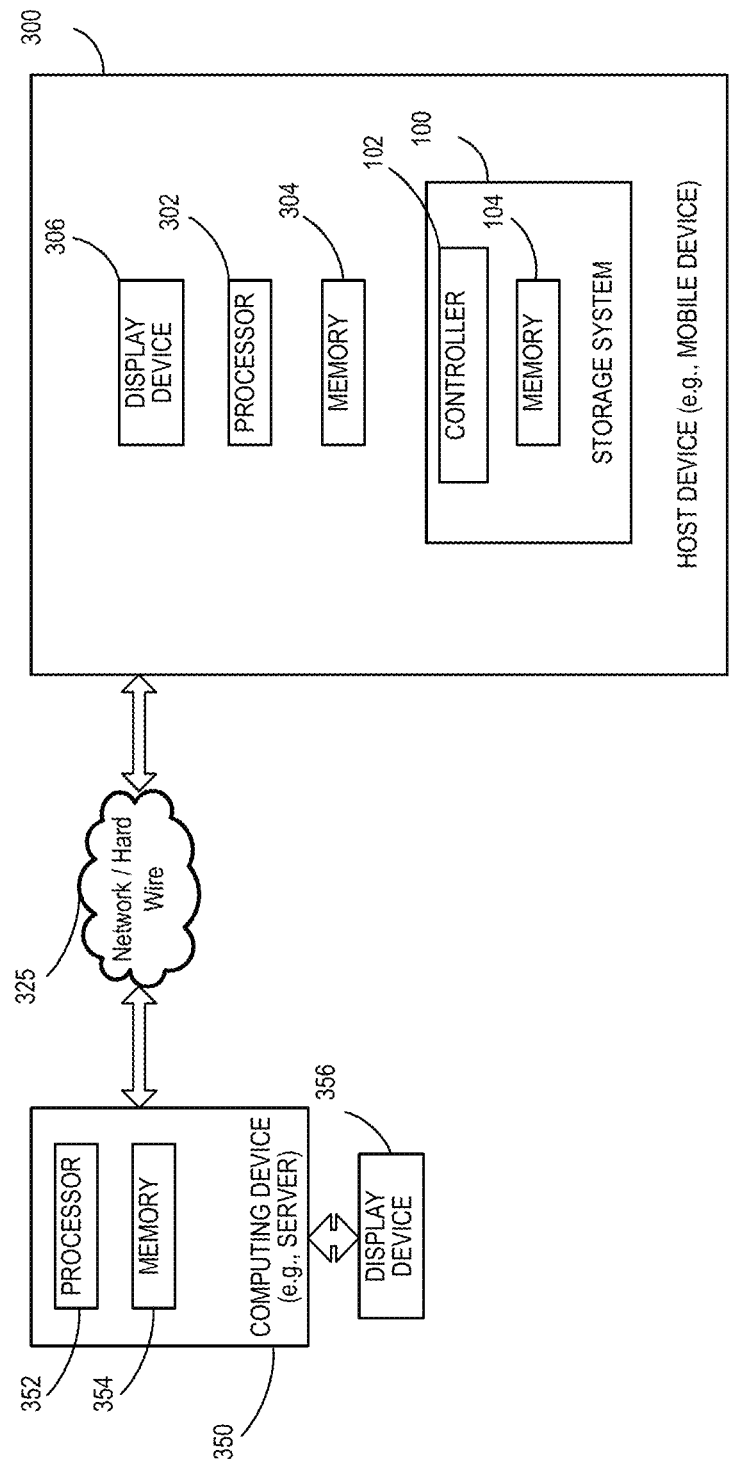
FIG. 3 is an illustration of a host device and other components of an embodiment.

As mentioned above, the storage system 100 can be part of a host device. For example, as shown in FIG. 3, the storage system 100 can be embedded in or removably connected to the host device, such as a mobile device 300. As used herein, a mobile device can refer to a device with a processor that is carryable by an average user. The mobile device 300 can take any suitable form, such as, but not limited to, a smart phone, a tablet, a "phablet," a book reader, or a digital media player. As shown in FIG. 3, in this embodiment, the mobile device 300 comprises a processor 302, a memory 304, and a display device 306 (e.g., a touch-sensitive display). The processor 302 can execute computer-readable program code (e.g., stored in the memory 304 of the mobile device 300 or in the storage system 100) to provide the mobile device 300 with various functionality. For example, the processor 302 can execute computer-readable program code to provide "apps" to a user.

In one embodiment, the mobile device 300 can contain a wireless and/or wired interface (not shown) to place the mobile device 300 in communication with another device. For example, FIG. 3 shows the mobile device 300 in communication with a computing device 350 (e.g., a PC or a server) via a network (e.g., an internet or the Internet) or hard wire connection 325. In this embodiment, the computing device 350 comprises a processor 352 and a memory 354 and is in communication with a display device 356 to display graphical output from the processor 352. The processor 352 can execute computer-readable program code (e.g., stored in the memory 354 of the computing device 350 or elsewhere) to provide the computing device 350 with various functionality. For example, the hardware and/or software in the computer device 350 can be used for user experience processing and analysis.

As discussed above, today's mobile platforms (e.g., a phone, tablet, or wearable device) are complicated systems containing many elements, both hardware and software. One such element is a storage system (either embedded or removable) that is used for data storage and retrieval. The typical design process of storage systems for these platforms typically considers only inner measurements of the storage chip to be relevant, with little regard for the user experience (UX) at the end of a long chain of potential bottlenecks that may or may not be related to the storage performance. User experience is affected strongly, for example, by time lags that are seen on the mobile device's graphical user interface (GUI) as black regions before they are filled with content.

Ideally, such time lags should not occur, and if they do occur, they can be analyzed in order to determine if the delay is attributed to the storage device or to the host application. In the past, the user experience measurements made on mobile platforms were performed primitively: the input of the use-case was conducted manually and based on eye estimations. These methods were inaccurate, inconsistent, and subjective. In many instances, the same exact test scenario could not be produced and/or different people observing the test scenario could see different results. The following embodiments provide a tool that can measure the impact that the storage system 100 has on the user experience, which can help understand the mobile platform better as an ecosystem for the storage system 100 and can allow for a better storage system design. This tool will sometimes be referred to herein as "the Visualizer," "the Visualizer tool," or "the Visualizer system."

In general, the Visualizer system can be used to correlate storage system behavior with user experience events of the mobile device 300. In one embodiment, the Visualizer system is configured to use computer vision and image processing algorithms to automatically analyze the graphical user interface displayed on the display 306 of the mobile device 300 in order to detect certain user interface events, sync those events with traces of read/write activity in the storage system 100, correlate the user interface events to storage system performance by inspecting the storage system traces, and provide an analysis of that correlation (e.g., a report or a graph of various user interface events superimposed and synchronized with storage system traces). This analysis comparing different storage systems on the same platform with the same preconditions (e.g., the same device with different parameters, same device type from different vendors, and different devices) can be useful to storage system researchers, system engineers, and technical marketing professionals.

In one embodiment, the Visualizer system is a MATLAB-based tool that can correlate storage behavior and mobile platform user experience events by applying image processing algorithms to analyze user experience events and correlate those events to storage performance by inspecting system traces. In operation, the tool can get sets of videos and storage traces as an input and output several graphs to analyze and correlate between user experience events and system traces. The tool can also perform an independent analysis of a single video to find specific user experience events. In one implementation, the tool contains a dedicated video player used to analyze two videos, a mechanism to generate storage and user experience events graphs that correlate the mobile device's user interface and that storage system's behavior, and different controls to enable analysis of these relations. Of course, other implementations are possible.

Figure 4:
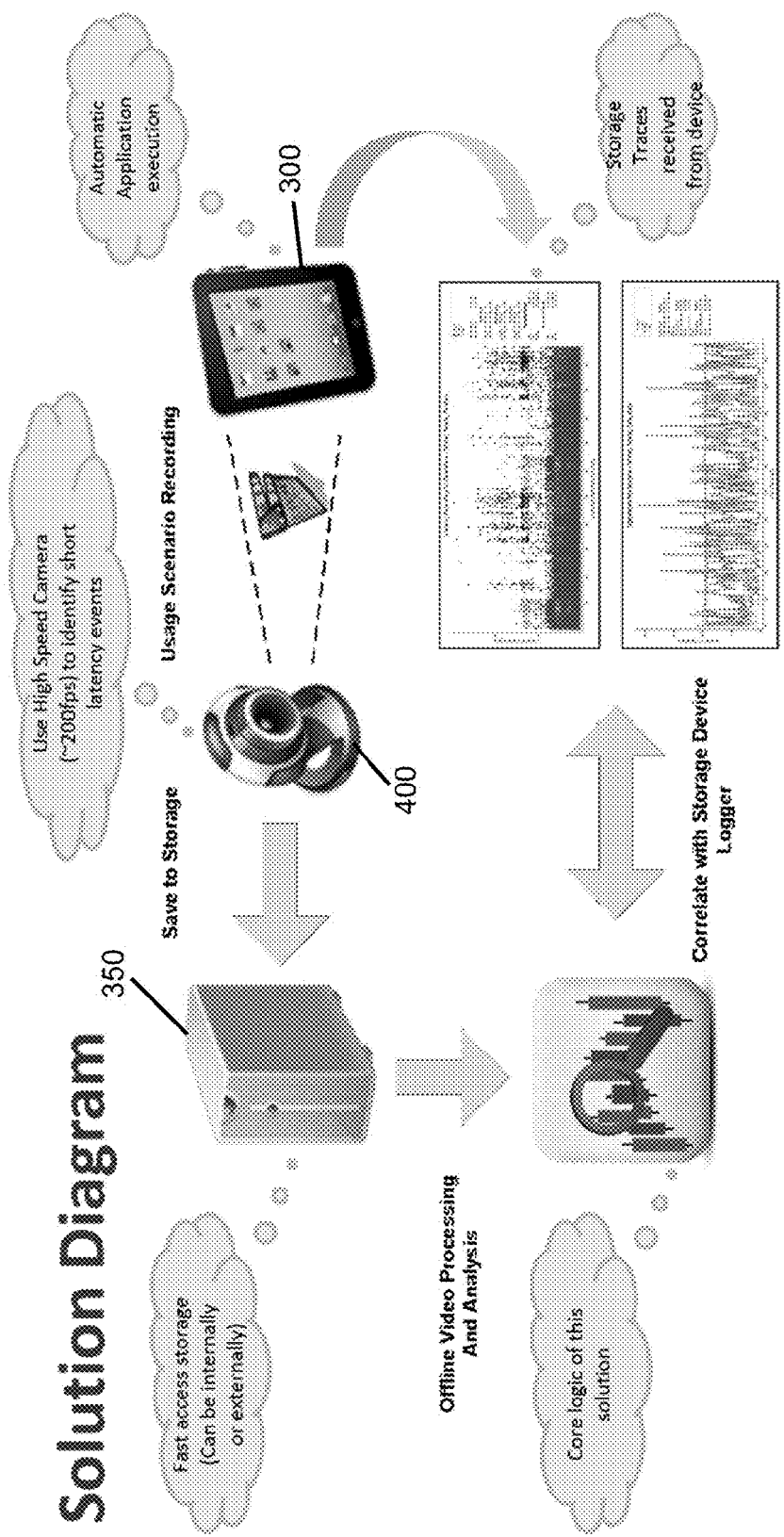
FIG. 4 is an illustration of a user experience processing and analysis method of an embodiment.
Figure 5:
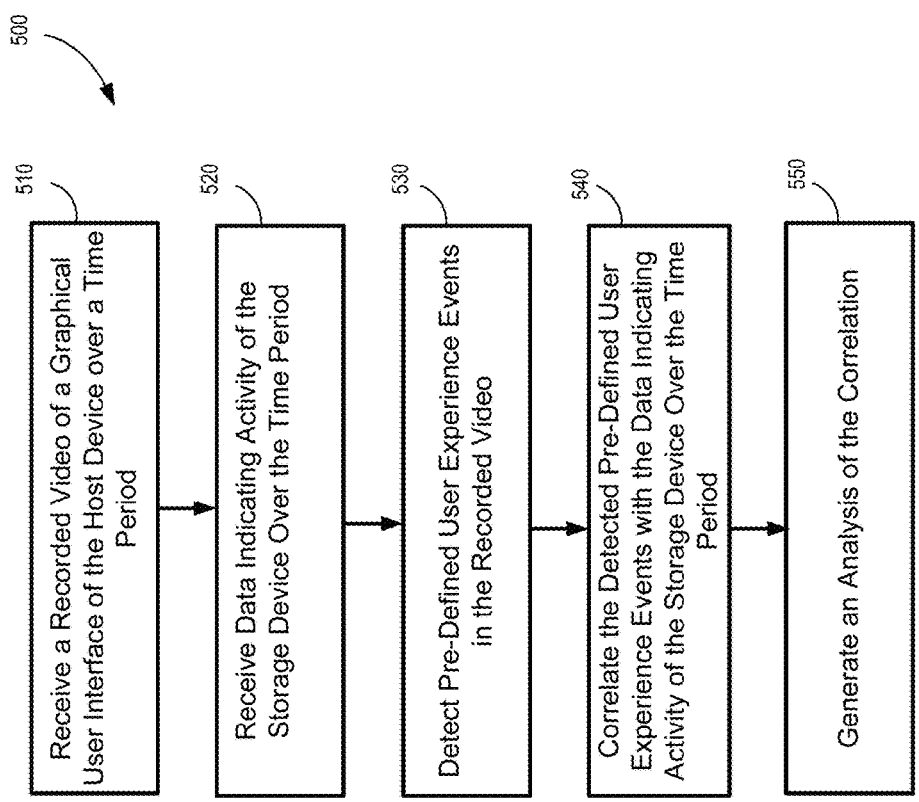
FIG. 5 is a flow chart of a user experience processing and analysis method of an embodiment.

Turning again to the drawings, FIGS. 4 and 5 are an illustration and a flow chart 500 of a user experience processing and analysis method of an embodiment. In this example, the mobile device 300 takes the form of a tablet, and the method in the flow chart 500 is performed by the computing device 350. As shown in these drawings, the graphical user interface of the mobile device 300 displays an output, which can be of one or more test events (usage scenarios) executed using an automatic application execution algorithm, which imitates a human user selecting different screen inputs. The computing device 350 receives a recorded video of a graphical user interface of the mobile/host device 300 over a time period (act 510). In this example, an external camera 400 (e.g., a high speed camera (~200 frames per second)) is used to identify short latency events displayed on the display device of the mobile device 300. However, in other embodiments, the video of the graphical user interface of the mobile device 300 is recorded using an application running on the mobile device 300.

The received video can be stored in fast-access storage, internal (e.g., memory 354) or external to the computing device 350. Also, optionally, the computing device 350 can filter the video to account for video compression, quality degradation, and/or other phenomenon. The computing device 350 also receives data indicating activity of the storage device 100 over the time period (act 520). The storage device activity can take the form, for example, of input/output operations, such as, but not limited to (random or sequential) read, (random or sequential) write, erase, move, trim, and discard. The activity of the storage device 100 can be presented as a trace (or trace file), which can be a log of input/output operations and its characteristics (parameters). Input/output operation characteristics (parameters) can also take any suitable form, including, but not limited to timestamps on initiation and completion, peripheral data (e.g., power state and aggregate queue depth), address in memory space, and size of command. The activity can also relate to CPU utilization, RAM usage, and kernel/operating system events, for example.

In one embodiment, the data indicating activity of the storage device 100 over the time period is synchronized with the recorded video. This can be done, for example, by having the program on the mobile device 300 that starts the automation write an entry (e.g., a time stamp and/or comments) in a log file of the tracer file that indicates the time that automated display began. The automation program can also send a signal to start the camera or app recording of the displayed output.

Next, the computing device 350 detects pre-defined user experience events in the recorded video (act 530). This is referred to as "offline video processing and analysis" in FIG. 4 (offline in the sense that it is based on the recorded video and not in real-time on the mobile device 100). As will be discussed in more detail below, the pre-defined user experience events can be detected using an image processing algorithm and a pre-defined template database. As will also be discussed in more detail below, the pre-defined user experience events can relate to one or more of the following: an application launch/application ready, a photo album load, a screen swipe, a start/end of an application installation, and a start or end of a camera burst of photos.

The computing device 350 then correlates the detected pre-defined user experience events with the data indicating activity of the storage device 100 over the time period (act 540). With the recording of the user experience events and the storage device activity synchronized, this step can involve looking at what storage device activity took place at the time of a given user experience event occurred.

Figure 6:
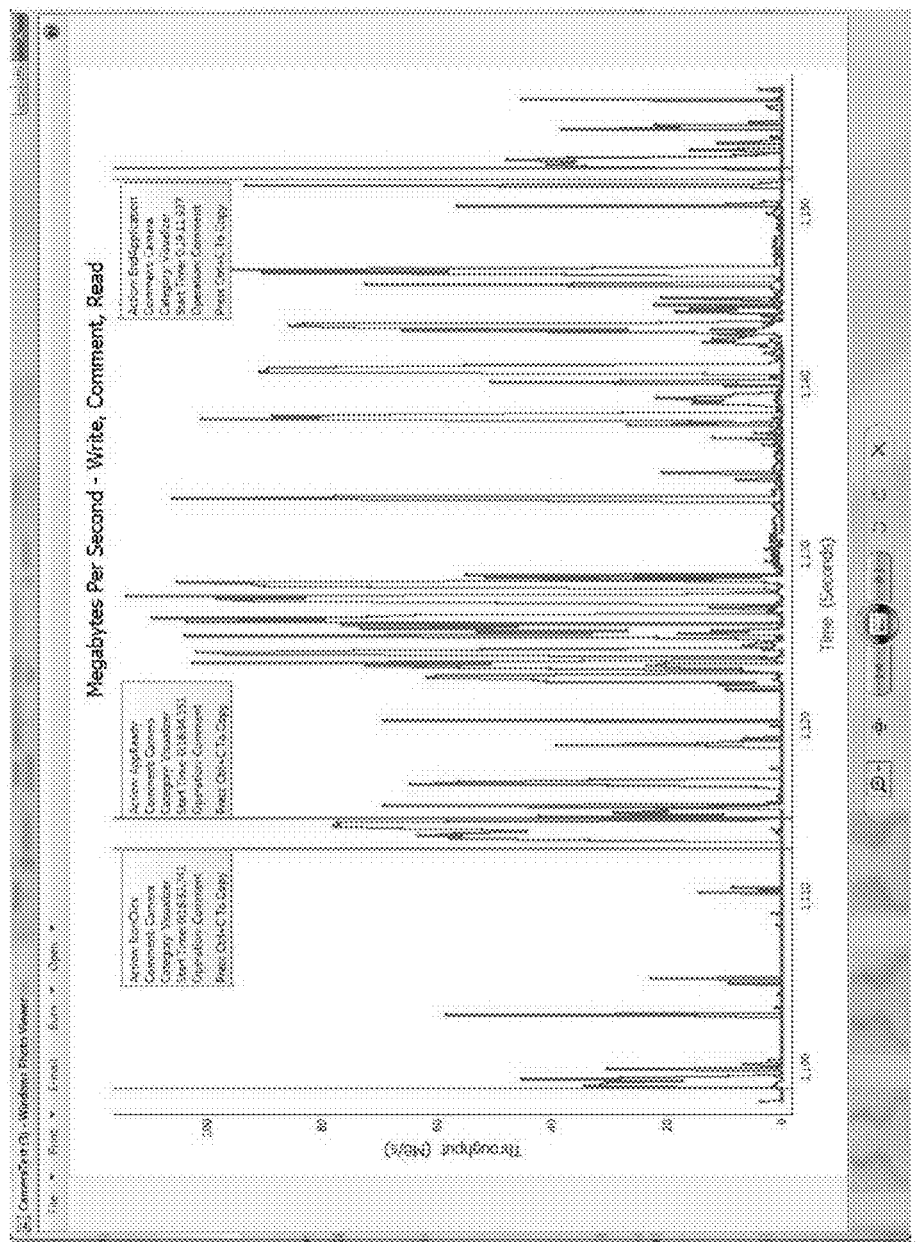
FIG. 6 is a graph of an embodiment showing a correlation between detected pre-defined user experience events and data indicating activity of a storage device over a time period.

Finally, the computing device 350 generates an analysis of the correlation (act 550). In one embodiment, the analysis comprises a report or graph. FIG. 6 is a graph of an embodiment showing a correlation between detected pre-defined user experience events and data indicating activity of the storage device 100 over the time period.

Figure 7:
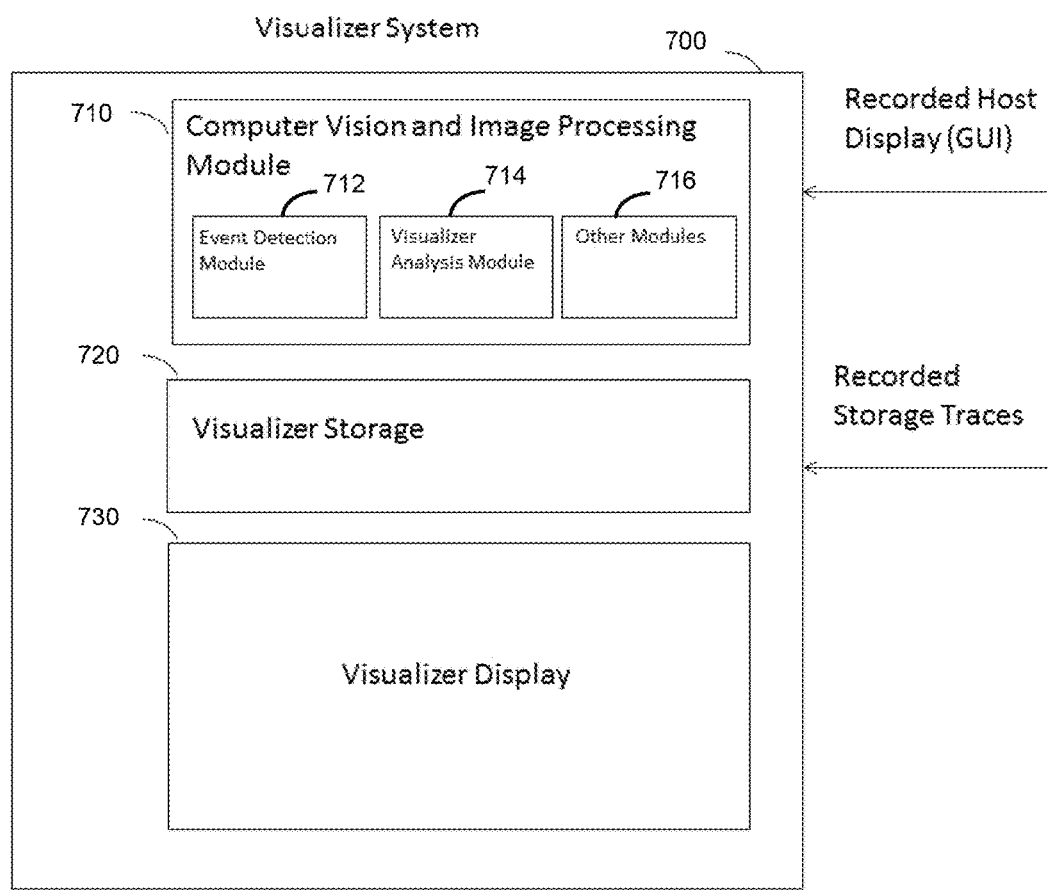
FIG. 7 is a block diagram of a visualizer system of an embodiment.
Figure 8:
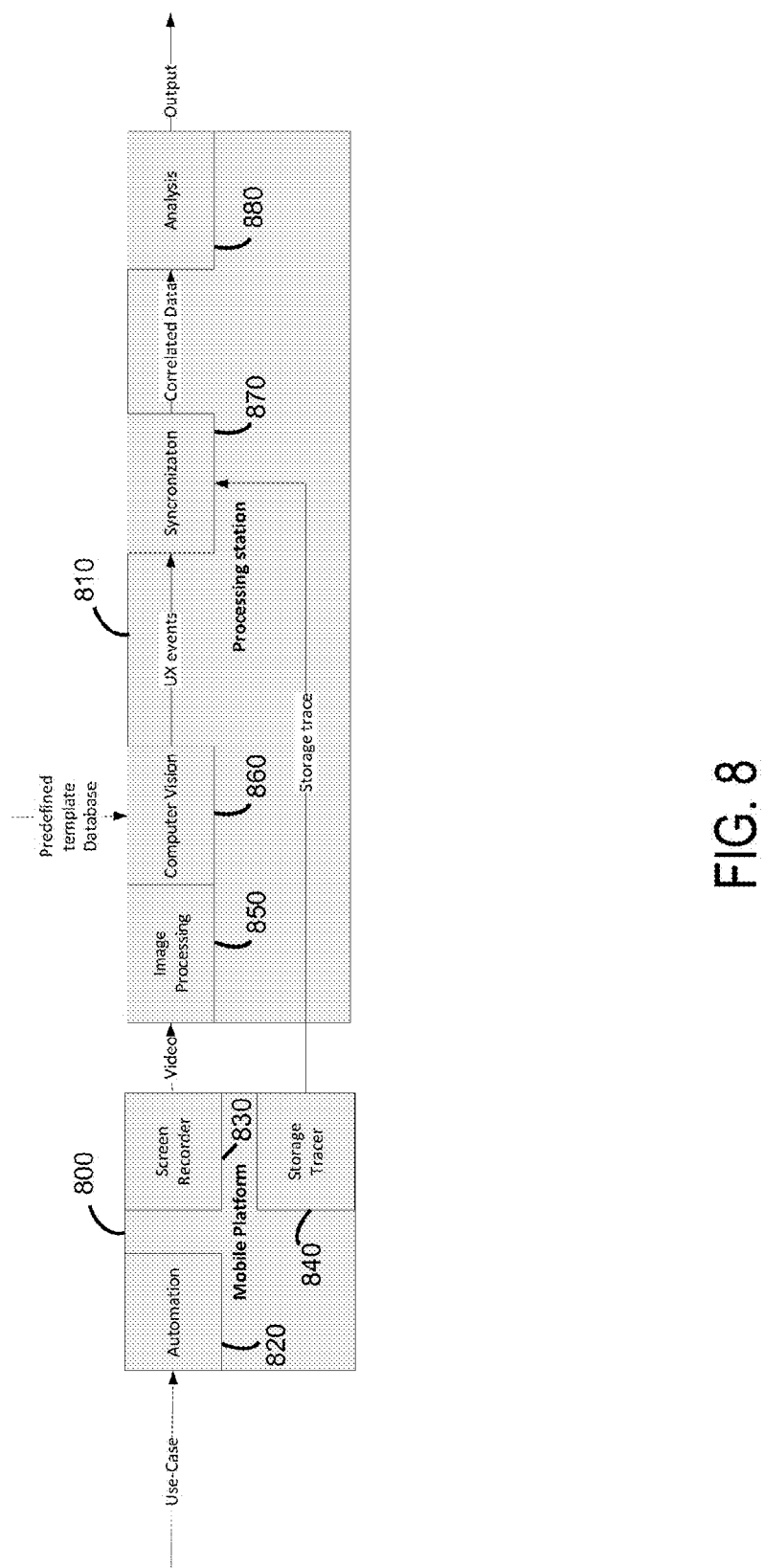
FIG. 8 is a block diagram of a mobile platform and a processing station of an embodiment.

As mentioned above, the user experience processing and analysis method discussed above can be implemented in a computing device 350 external to the mobile device 100. Any suitable implementation can be used, and FIGS. 7 and 8 provide examples of such implementations. It should be noted that these are merely examples, and details of these examples should not be read into the claims. Also, other implementations can be used.

Turning first to FIG. 7, FIG. 7 shows a visualizer system 700 of an embodiment, which can be implemented with the computing device 350 of FIG. 3. As shown in FIG. 7, the visualizer system 700 of this embodiment comprises a computer vision and image processing module 710, which itself comprises an event detection module 712, a visualizer analysis module 714, and other modules 716. The visualizer system 700 in this embodiment also comprises visualizer storage 720 and a visualizer display 730.

In general, the visualizer system 700 is configured to receive a recorded host display GUI via an external camera or an internal application executed by the host that provides a video file of the host recorded screen. In addition, the visualizer system 700 is configured to receive storage device traces, which may include marking events for synchronization with the recorded GUI. The visualizer system 700 is configured to use the computer vision and image processing module 710 on the received video files stored in visualizer storage 720 to detect user experience events. The visualizer system 700 is also configured to synchronize detected user experience events with storage traces and provide reports and graphs on the display 730.

In one embodiment, the visualizer system 700 uses the event detection module 712, the visualizer analysis module 714, and a database generator in the process of detecting user experience events. For example, in one embodiment, the event detection module (or event detector) 712 is configured to detect user experience events in the recorded video (e.g., a single screen recorded video) of the graphical user interface of the host device over a time period. As discussed herein, the event detector 712 can use a database generator to create a reference image database for the event detector 712.

The event detector 712 can use an image processing algorithm and can also filter the video to account for video compression, quality degradation, and/or other phenomenon. The database generator is configured to create a reference image database for the event detector 712 to use to detect the user experience events in the recorded video, and the event detector 712 is configured to correlate the detected user experience events with traces of activity of a storage device in the host device over the time period and generate an analysis of the correlation.

FIG. 8 illustrates another implementation where a mobile platform 800 (e.g., the mobile device 300) is in communication with a processing station 810 (e.g., the computing device 350). As shown in FIG. 8, the mobile platform 800 comprises an automation application module 820, a screen recorder 830, and a storage tracker 840. The processing station 810 comprises an image processing module 850, a computer vision module 860, a synchronization module 870, and an analysis module 880.

In operation, in this embodiment, the mobile platform 800 gets a use-case script as an input, automates it with the automation module 820, and records both the storage activity (with the storage tracker 740) as well as everything presented on screen (the GUI) (with the screen recorder 830 (so, this embodiment doesn't use the external camera)). The Visualizer system is embodied in the processing station 800 in this embodiment and is configured to receive a video file from a mobile platform 800. The video file is processed with an image processing module 850 using a pre-defined template database for the computer vision system 860. The image processing module 850 can also filter the video to account for video compression, quality degradation, and/or other phenomena. Pre-defined user experience events (e.g., application launch/ready time, photo album load, swipe, camera burst, app install, etc.) are identified and synchronized with storage traces (using the synchronization module 870), and the correlated data is input to an analysis module 880, which compares pre-defined storage patterns to tested storage traces and outputs the results (e.g., a report or graph).

This and the following paragraphs provide examples of various user experience events that can be processed and analyzed. For example, in one embodiment, the visualizer system is used to detect the time lag between when an application is launched ("app launch") and when it is ready to be used ("app ready"). In this embodiment, the event detection module 712 (FIG. 7) (or, more generally, the processor 352 in the computer device 350 (FIG. 3)) can analyze the recording of the graphical user interface display to detect visual clues that indicate when an app is launched and when the app is ready to be used. For example, the event detection module 712 can use information about the grid of app icons displayed on the mobile device's home screen (e.g., the number of icons and the locations of the icons on the phone launcher grid), a list of what each icon will look like when it is selected to launch an app (an animated app launcher can be used to detect a user app launch button press), and a list of "app ready" images for each app (images that will be displayed when the app is ready to be used after launch is completed), with the screen location for the images. In one embodiment, this information is part of an XML file, and each mobile device platform can have its own XML file (a utility tool can be used to create the XML file and images).

Figure 9A:
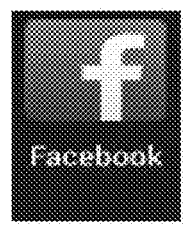
FIGS. 9A and 9B are illustrations of "app launch" and "app ready" images of an embodiment.
Figure 9B:
Figure 9B:

FIGS. 9A-13 provide an illustration of this example. FIG. 9A is an image of the Facebook app icon as it would appear when a user presses the icon to launch the Facebook app on the mobile device 300. (Facebook is just an example, and other or different apps can be used with these embodiments.) This icon is a "shaded" (e.g., "grayed out") version of the icon that normally appears, and the "shaded" nature of the icon represents that the icon was pressed (and the application is being launched). FIG. 9B is a pre-defined image of what would appear on the graphical user interface of the mobile device 300 after the Facebook app has been launched and is ready to used. This image shows the top and bottom "anchors" of what would be displayed when Facebook is ready to use.

Figure 10:
FIG. 10 is an illustration of a graphical user interface of a mobile device of an embodiment after an app icon is selected.
Figure 11:
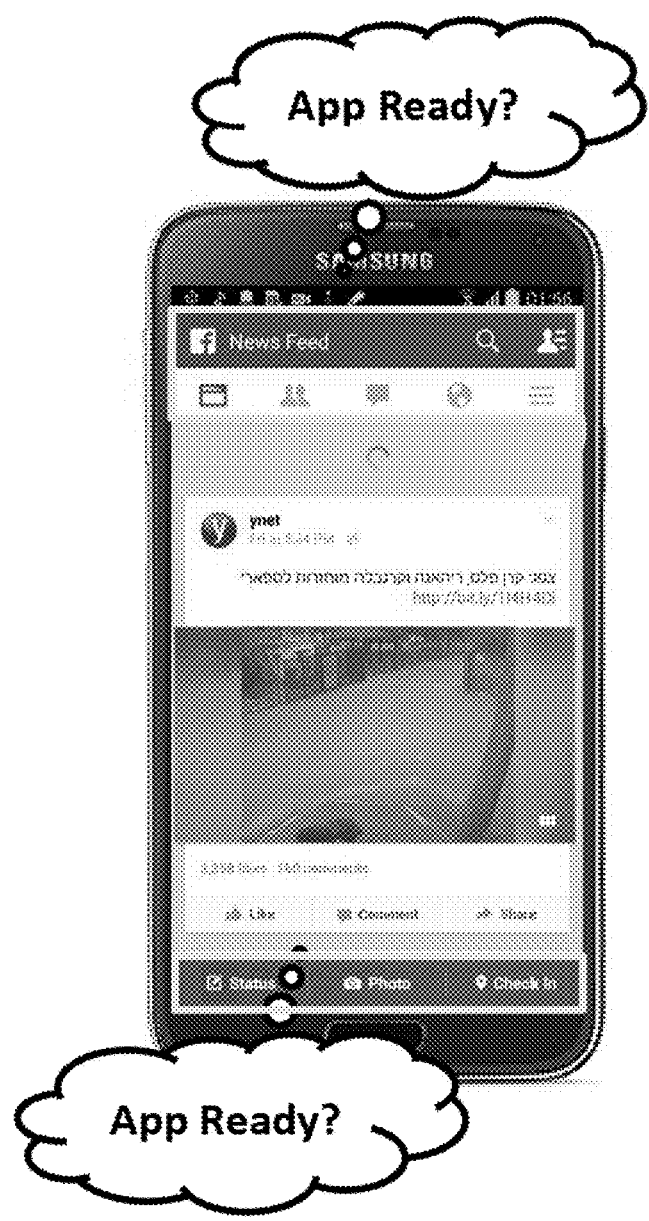
FIG. 11 is an illustration of a graphical user interface of a mobile device of an embodiment after the app is launched.
Figure 12:
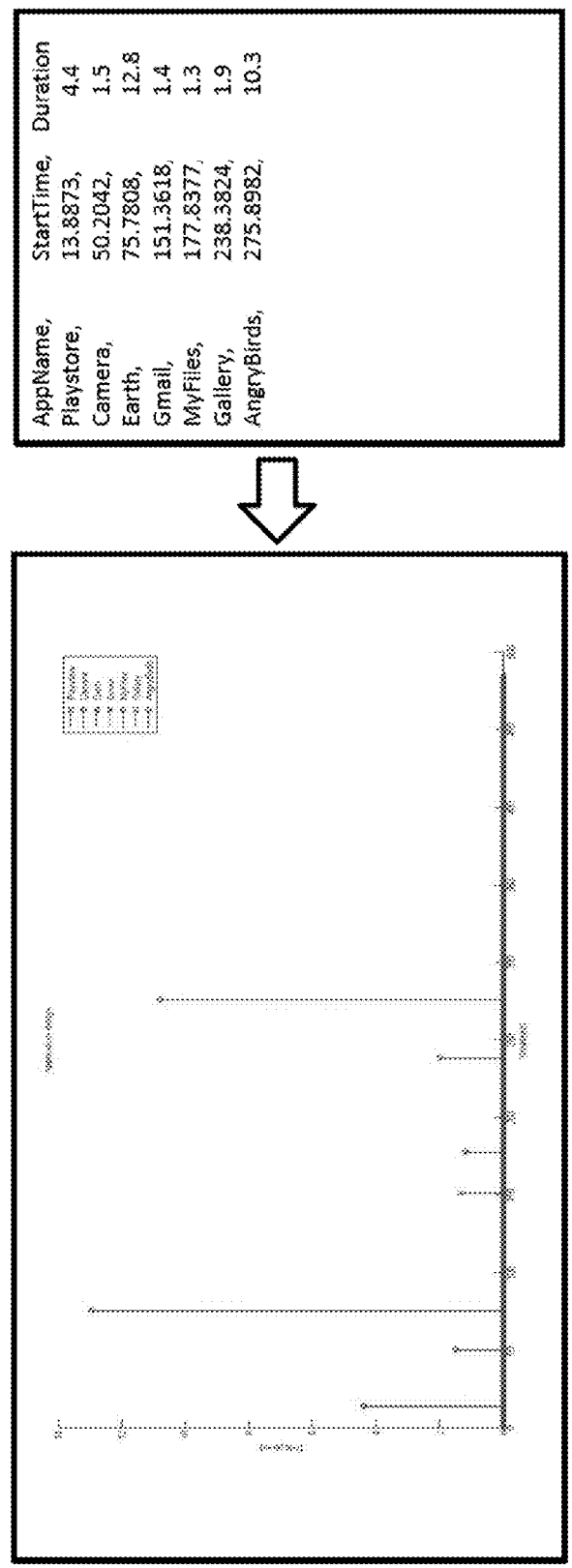
FIG. 12 is a graph of an embodiment showing application delays.

As shown in FIG. 10, the event detection module 712 (using the pre-defined XML discussed above) identifies the phone icon grid layout in the recorded video of the graphical user interface on the display of the mobile device 300. The event detection module 712 (e.g., using a change state machine) looks for any of the icons changing to the shaded version of the icon, as pre-defined in the XML file. This can be done by executing an algorithm on a single video to detect app launch events that are defined in its XML definition. Here, when the Facebook icon changes to the shaded version (e.g., after an animated launcher app (e.g., Nova) in the mobile device 300 causes the icon to be selected), the event detection module 712 identifies the change in the Facebook icon; specifically, that it looks like the shaded version pre-defined in the XML file. The event detection module 712 then searches the graphical user interface for the app ready event image (in the example, "anchor" image in FIG. 9B) that indicates that the app is ready to be used. This can be done using a pre-defined image template list. The list of images can be supplied as an XML file input to the event detection module 712 (there can be a utility program that can help create this XML file, which would be helpful in supporting new platforms and apps). As shown in FIG. 11, when the graphical user interface of the mobile device 300 shows the app ready images of FIG. 9B, the event detection module 712 concludes that the application is ready to be used. The event detection module 712 can then calculate the time between the display of the two images in FIGS. 9A and 9B and then display a graph (see FIG. 12) of the app launch event (and other app launch events) versus the delay in launching the app (e.g., after generating a list of app launch events into a raw data text file). The event detection module 712 can also correlate the delays with activity of the storage device 100 in the mobile device 300, and generate an analysis of the correlation, as discussed above. In one embodiment, the event detection module 712 outputs an ".app" file, which is a modified storage trace file with the user experience events in it. This ".app file" can be displayed as a graph using a separate tool.

As discussed above, the event detection module 712 uses a pre-defined template database to search the recorded video image for app launch and app ready images to determine a delay in launching an application. It should be noted that a different pre-defined template database can be used to search for other pre-defined user experience events in a recorded video image, which allows the event detection module 712 to be used with a variety of other use cases. Before examples of some of these other use cases are provided, the following paragraphs will discuss a database generator, which can be used to create a reference image database for the event detection module 712.

In general, a database generator is software that can be run on the computing device 350 or some other device to create a set of images that the event detection module 712 will look for in a single recorded image from the display 306 of the mobile device 300. For example, in the above use case, the database generator can be used to create the set of app icons/app ready images that can be detected by the image processing analysis of the event detection module 712 to detect an application launch event. The output of the database generator can be a set of XML text files used as a database for the event detection module 712.

Figure 13:
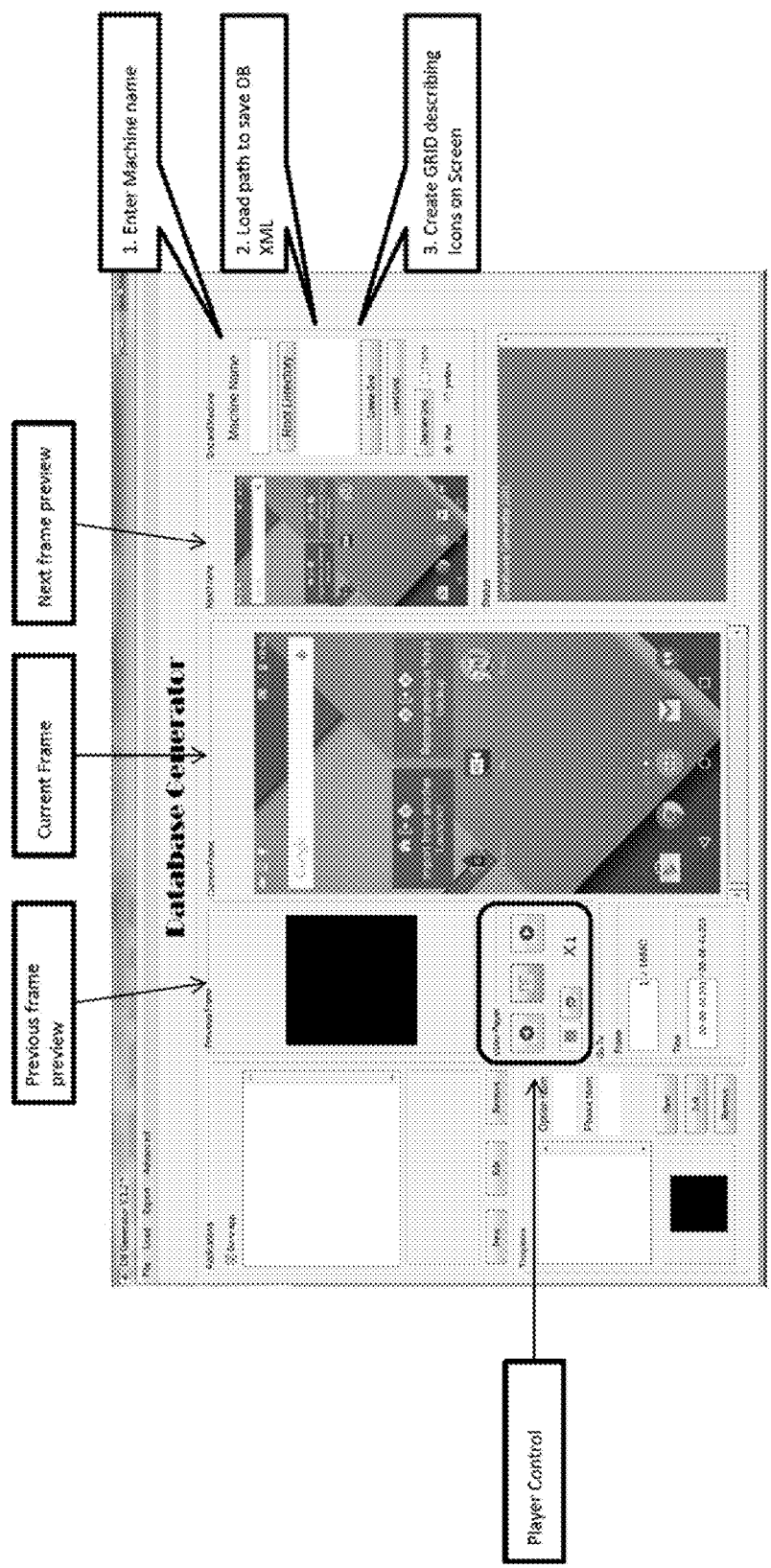
FIG. 13 is an illustration of a graphical user interface of a database generator of an embodiment.

The database generator can provide a graphical user interface (GUI) (see FIG. 13) for a user to use in creating the database. In operation, a user can select a platform type (e.g., phone or tablet) and load a reference video into the database generator for analysis. As shown in FIG. 13, the GUI for the database generator has player controls for the reference video, a previous frame preview region, a current frame region, a next frame preview region, as well as various areas for entry of various data, such as machine name, load path, and grid creation buttons. Using this GUI, a user can navigate through a reference video and identify the various images (pre-defined user experience events) that the event detection module 712 will look for later when it analyzes a recorded video of a mobile device 300 under test.

Figure 14:
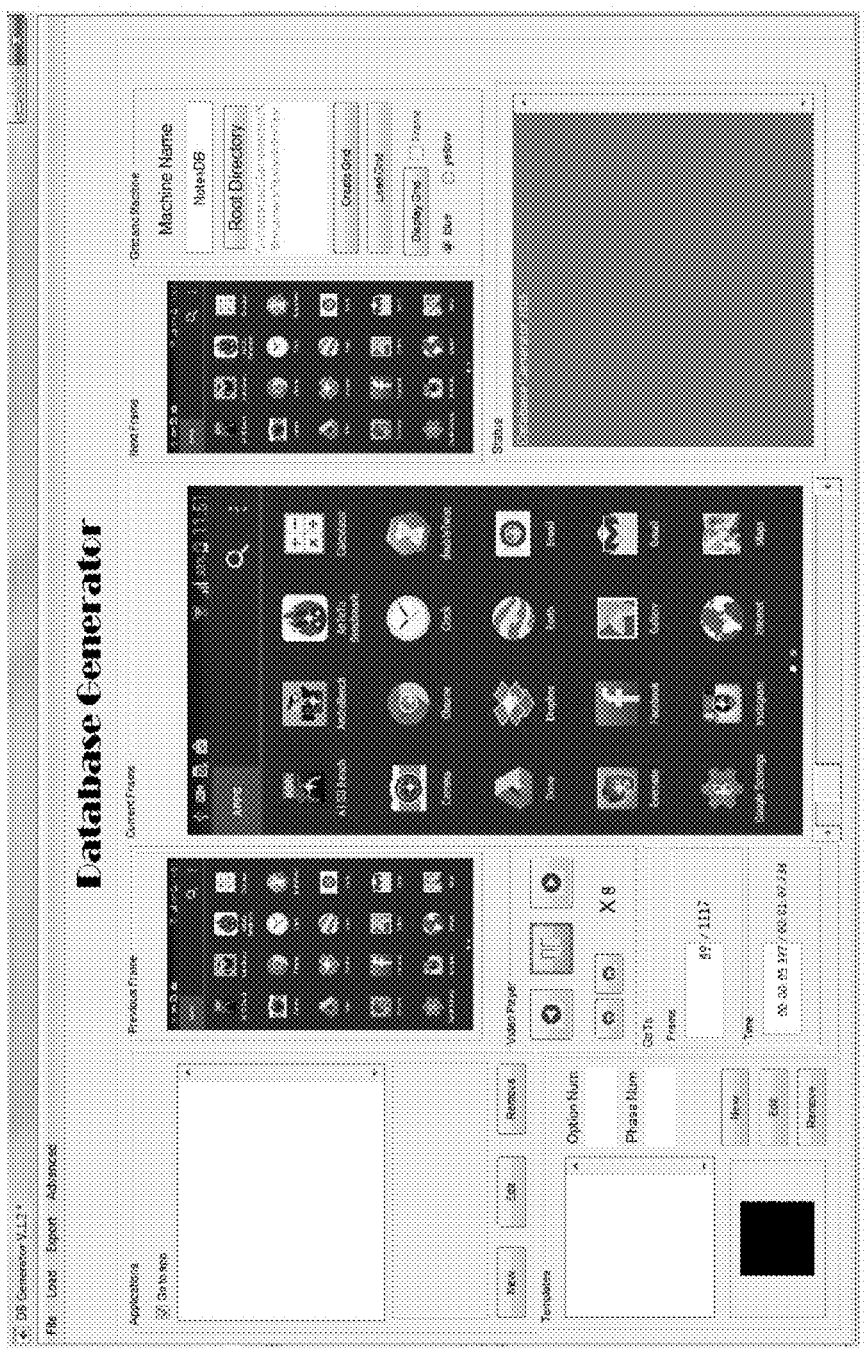
FIG. 14 is an illustration of a graphical user interface of a database generator of an embodiment when used to create a phone icon grid.

For example, FIG. 14 is an illustration of the database generator GUI when used to create the phone icon grid discussed in the prior paragraphs. Using this GUI, a user would play a reference movie until it gets to the main phone screen launcher. The user would then select the "create GRID" button and then click on the middle point of every icon using the mouse pointer. Eventually, in this example, there should be 20 points, one point in the middle of each icon. The user can then use the database generator GUI to select app images for identification. For example, the user can select the icon of the first app to be detected. The database generator would then look for this icon change and connect it to the app launch. The user can play the movie until it gets to the ready image for the app. When the user selects the ready image, the user can click on the new template button to add the app ready images, after which the user can select the ready image, so that the app detector can detect with the app is ready.

As noted above, in one embodiment, the output of the database generator can be a set of XML text files used as a database for the event detection module 712 (of course, other outputs can be generated). In operation, a user can click the "export XML" button on the database generator GUI to generate the XML database that will be used by the app detector to analyze recorded videos of a mobile device under test.

It should be noted that while the above example used the event detection module 712 to analyze pre-defined user experience events in a recorded video of a single screen/mobile device 300 to determine delay between app launch and app ready images, the event detection module 712 can be used for other use cases by changing the pre-defined user experience events that the event detection module 712 is looking for. For example, in another embodiment, the event detection module 712 is used to determine how long it takes to load a photo album on the mobile device 300 (i.e., the total images load time and/or the number of frames loaded). To load a photo album, the mobile device 300 would click the photo icon on the icon grid screen. So, the database generator can be used to look for the "photo icon click" and app ready images specific for the photo app, just as in the above example. However, in this example, the database generator can also be used to add two more phases to the database: start album and end album. The start album image could be the earliest (first) photo in the album. Since the last photo in the album may be unknown or can change over time, the end album indicator can be the image that is displayed (the app ready screen) after the automation causes the back button to be hit after all the photos have been loaded. If more than one page of photos is present, the event detection module 712 can detect scrolling/swiping to the last page. In this case, the event detection module 712 can accumulate the time from the swipe end until a page of images is fully loaded or until a new swap is started.

Figure 15:
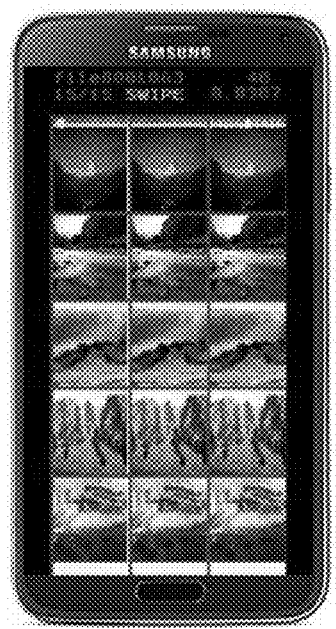
FIG. 15 is a screen shot of a mobile device of an embodiment.

As shown in FIG. 15, in one embodiment, grid lines can be placed around images to assist the event detection module 712 in noticing swipes and to follow the swipe start/finish. Also, in one embodiment, the recorded video of the mobile device 300 under test is loaded with a predefined number of photos (e.g., 4 GB, which is about 600 images), cleans its photo app cache, and enters the pre-loaded image database album. An automatic script in the mobile device 300 under test can wait a predefined amount of time between screen swipes.

Figure 16:
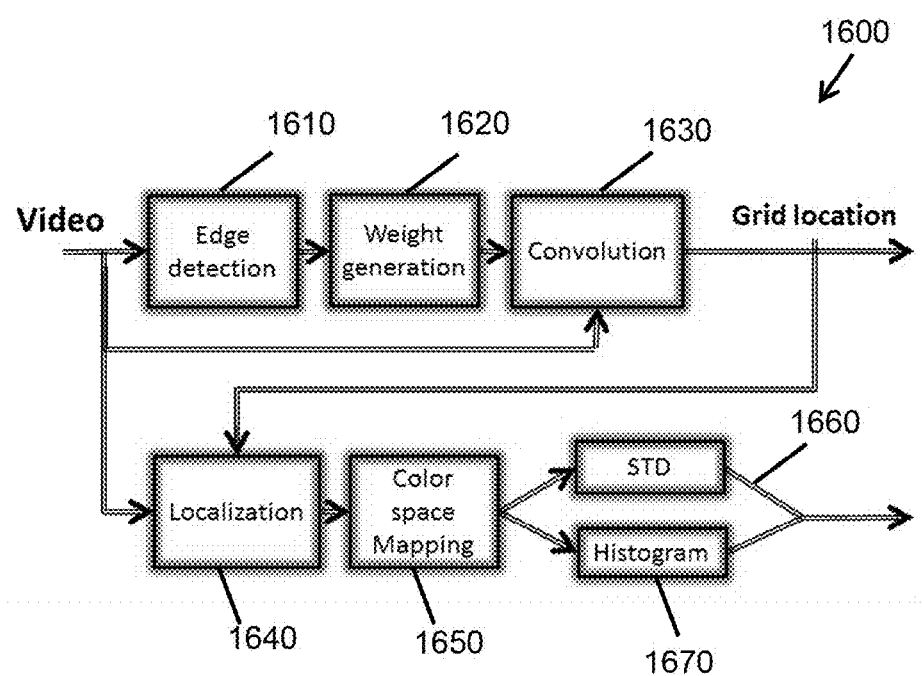
FIG. 16 is a flow chart of a photo correction method of an embodiment.

To further assist in the analysis, the event detection module 712 can perform image processing of the photos. FIG. 16 is a flow chart 1600 of a method of an image processing method of an embodiment that can be used to assist in the process. In one embodiment, this algorithm is run by the computer vision and image processing module 710 in FIG. 7. As shown in FIG. 16, the event detection module 712 can perform edge detection (1610), weight generation (1620), and convolution (1630) of the video under analysis. The output of this processing is grid locations of the photos, which are processed, along with the video, by a localization module (1640). After color space mapped (1650), standard (1660) and histogram (1670) outputs are provided.

As mentioned above, the above descriptions of what can be detected by the event detection module 712 are just examples, and other use cases can be used. For example, the event detection module 712 can be used to detect a start or end of a camera burst of photos (e.g., detecting the click on the snapshot button) or the start/end of an application installation (e.g., using the status bar icon as indications). As should be clear from the many examples presented herein, various use cases can be used with these embodiments, and a particular use case (whether or not described herein) should not be read into the claims.

Also, while the above embodiments described detecting a user experience event and correlating it with storage device traces, the visualizer system can contain additional or alternate functions. For example, with reference again to FIG. 7, the visualizer system 700 can additionally or alternatively comprise a visualizer analysis module (or visualizer) 714. In this embodiment, the visualizer 714 is a user experience based comparative tool for videos recorded off of screens of two (or more) mobile devices. Here, the two videos are synchronized based on content rather than time, so the visualizer 714 can detect dropped and/or duplicate frames, correlate them with usage activity/traces of the storage devices of the mobile devices, and output an analysis (e.g., reports and/or graphs). In one embodiment, the visualizer 714 can contain a dedicated video player to load and compare two videos (a reference video and a test video), synchronize the video and storage device traces, detect dropped and/or duplicate frames, generate an analysis of the correlation of dropped and/or duplicate frames and storage device traces, generate a four-view video (e.g., two videos from frame sync and two videos for time sync), and output an analysis of the relations between storage device and the user experience events (e.g., dropped and/or duplicate frames).

It should be noted that this embodiment of comparing two videos and detecting dropped/duplicate frames and correlating them with storage device traces can be used alone or in combination with the above embodiment of detecting a user experience event and correlating it with a storage device trace. Also, the various features of the system can be used along or in combination. Also, when parts of or all of both embodiments are used together, the system can be configured to switch between operation modes either manually or (semi-)automatically based on, for example, a measurement, an algorithm, or heuristics. Further, this tool can be used to analyze the impact of other elements in the system (e.g., DRAM, graphical processing unit (GPU), etc.).

Figure 17:
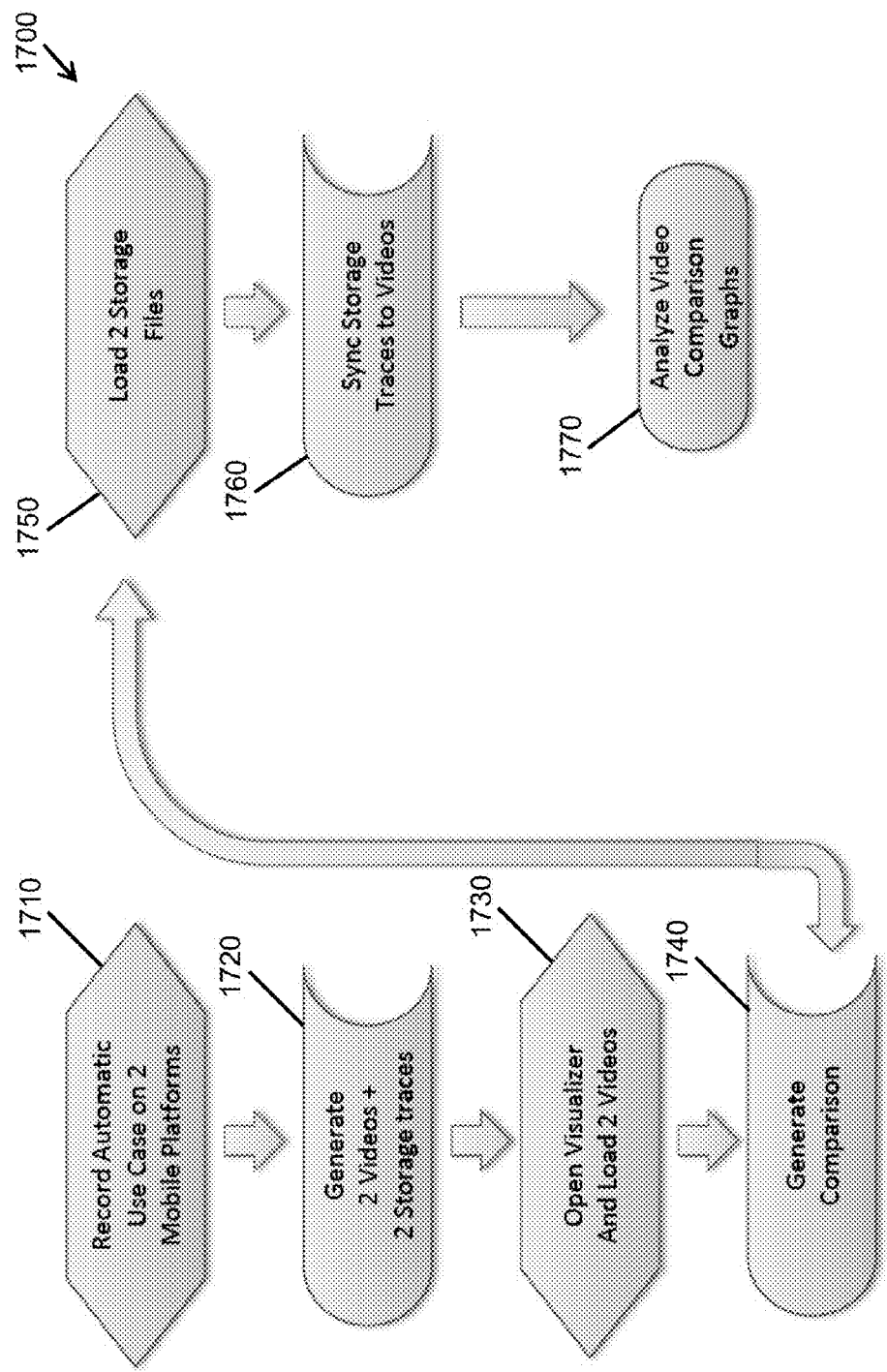
FIG. 17 is a flow chart of a method of an embodiment for comparing two videos that are synchronized based on content rather than time.

FIG. 17 is a flow chart 1700 of a method of an embodiment that can be implemented by the visualizer 714 to compare two videos of the same use case. In one implementation, this algorithm does not need any prior information, and the comparison will yield a lead-lag mapping between the two videos. As shown in FIG. 17, in the embodiment, an automatic same use case is recorded on two mobile platforms (act 1710). In one embodiment, the two mobile platforms are the same and are set-up similarly (e.g., same icons, wallpaper, time, network connection, status bar icon, version number, etc.). Next, the two mobile platforms generate respective videos and storage traces (act 1720). As with the above embodiments, the videos from one or both of the mobile devices can be recorded using a camera external to the mobile device(s) or can be captures by an application running in the mobile device(s).

The visualizer 714 then loads the two videos (act 1730) and generates a comparison of the two files (act 1740). Optionally, the visualizer 714 can filter one or both videos to account for video compression, quality degradation, and/or other phenomenon. As noted above, in this embodiment, the two videos that are compared are synchronized based on content rather than time. To do this, the visualizer 714 can separate the two videos into frames, number each frame, and then rebuild the numbered frames into new videos. The visualizer 714 can separate one of the videos (the test video) into frames and make a comparison between the frames of the originally-numbered video and the frames of the under-test video.

Figure 18:
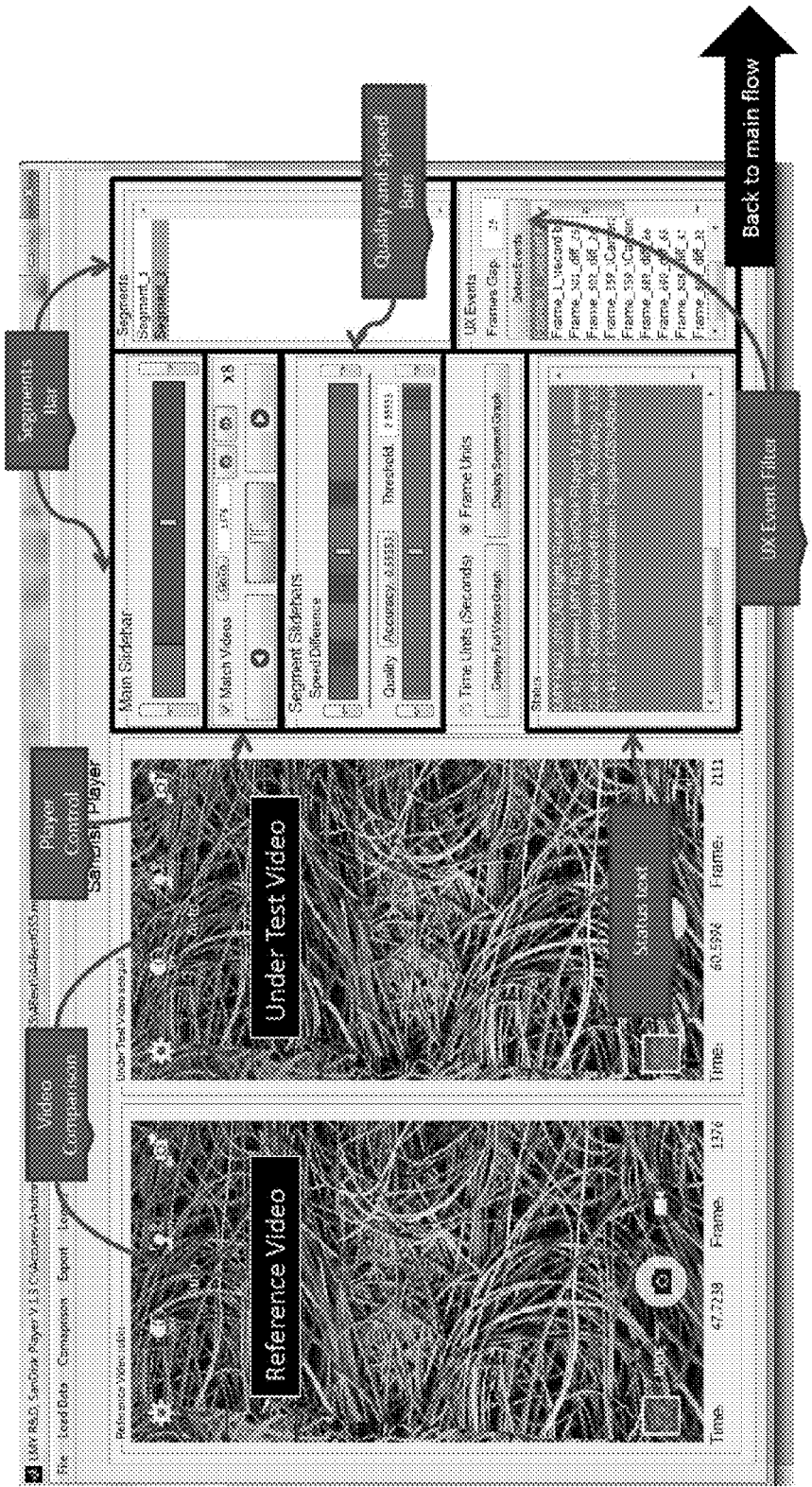
FIG. 18 is an illustration of a graphical user interface of a visualizer of an embodiment.
Figure 19:
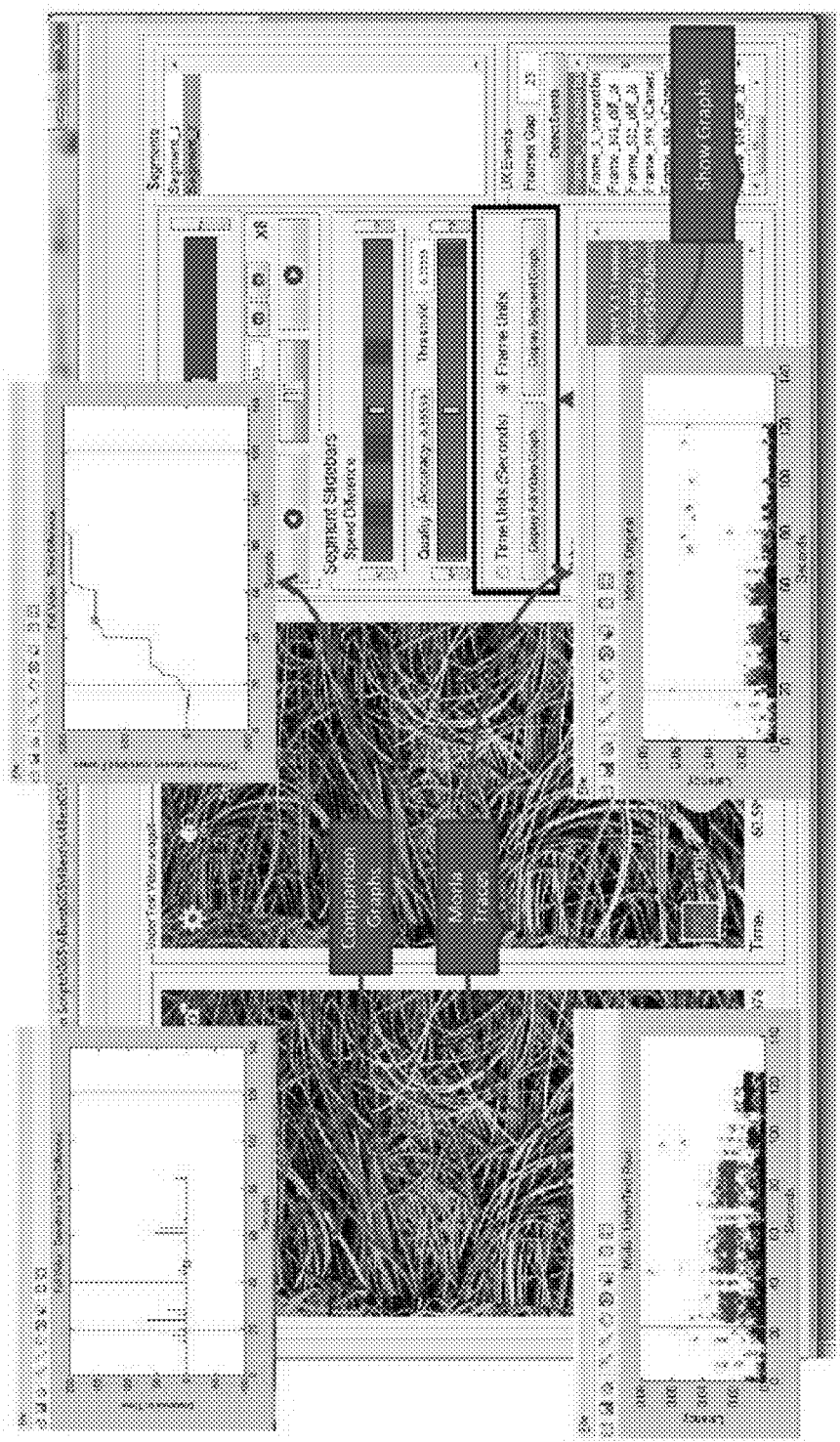
FIG. 19 is an illustration of a graphical user interface of a visualizer of an embodiment showing generated graphs.

FIG. 18 is an illustration of the GUI of a visualizer 714 of an embodiment showing the comparison. As shown in FIG. 18, the GUI is displaying two videos (e.g., of two of the same mobile devices, but in different configurations (one reference, one under test)) via a dedicated video player. The visualizer 714 allows side-by-side playback to match content, regardless of playback time. Accordingly, both playback windows will show the same event happening. This way, the user can tell the time difference/frame number between the two videos, which, as discussed below, can be helpful in detecting dropped and/or duplicate frames. The visualizer 714 also loads the two trace files (act 1750) and syncs the storage traces to the videos (act 1760). Lastly, the visualizer 714 generates and analyzes video comparison reports or graphs (act 1770). Examples of some of these graphs are shown in FIG. 19.

As mentioned above, the visualizer 714 can be used to detect dropped frames in an under-test video with respect to an original or reference video. One embodiment uses a derivative graph and missing frame timing to represent a missing frame. In general, the dropped frame algorithm executed by the visualizer 714 in this embodiment divides a movie into scenes according to big changes in the image. Then, the algorithm searches each frame of the original movie in the under-test video in two phases: a large search phase and a small search phase. In the large search phase, according to the image presented, the algorithm searches what scene of a given frame is related to with the highest probability. In the small search phase, according to the numbers on top of the frames, the algorithm searches inside a specific scene for a specific frame number. In this method of scanning, the algorithm compares the frame number in question to all the frame numbers in a specific scene. If the algorithm does not find the number, the frame is a dropped frame.

Figure 20:
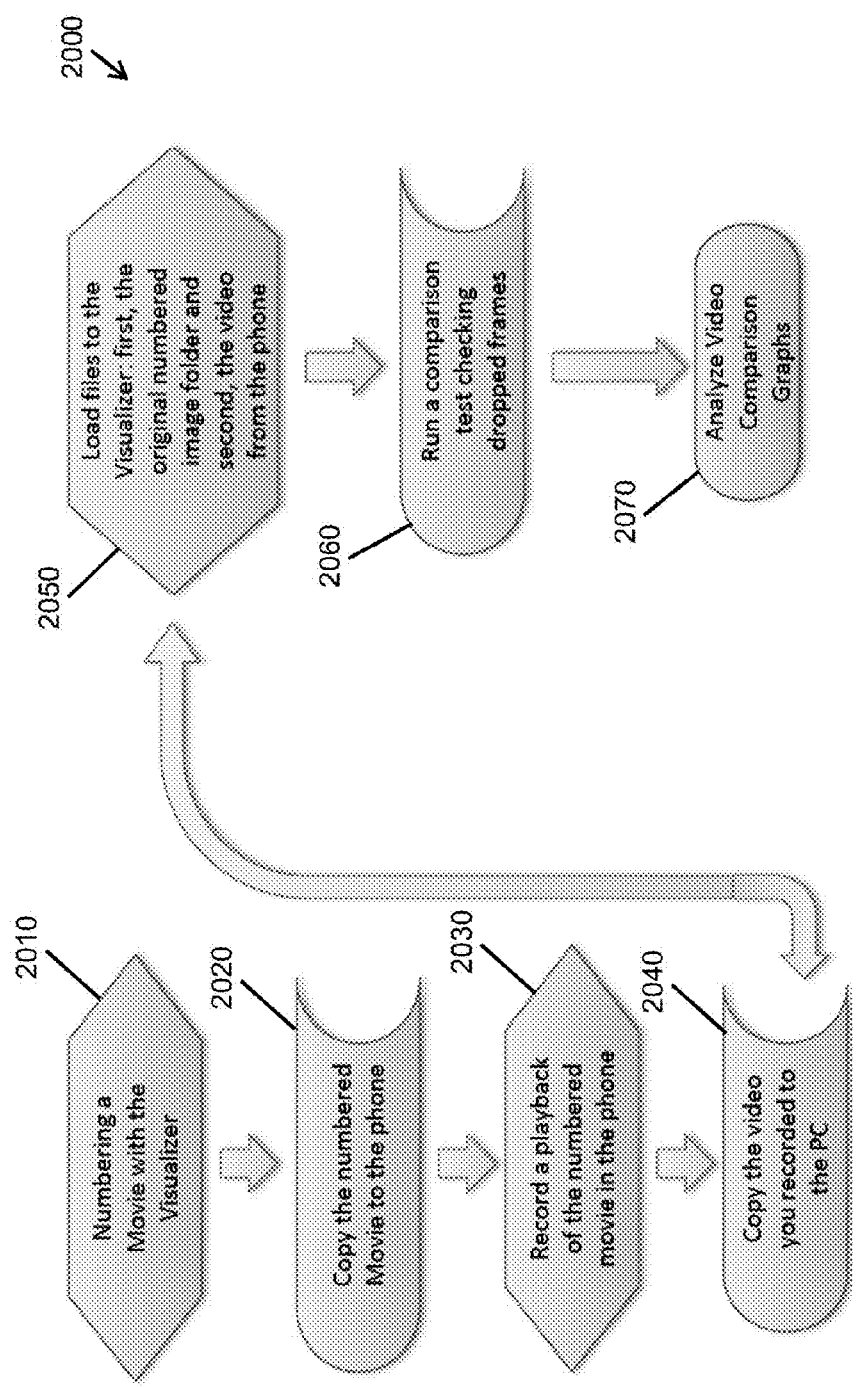
FIG. 20 is a flow chart of a method of an embodiment for detecting dropped frames.
Figure 21:
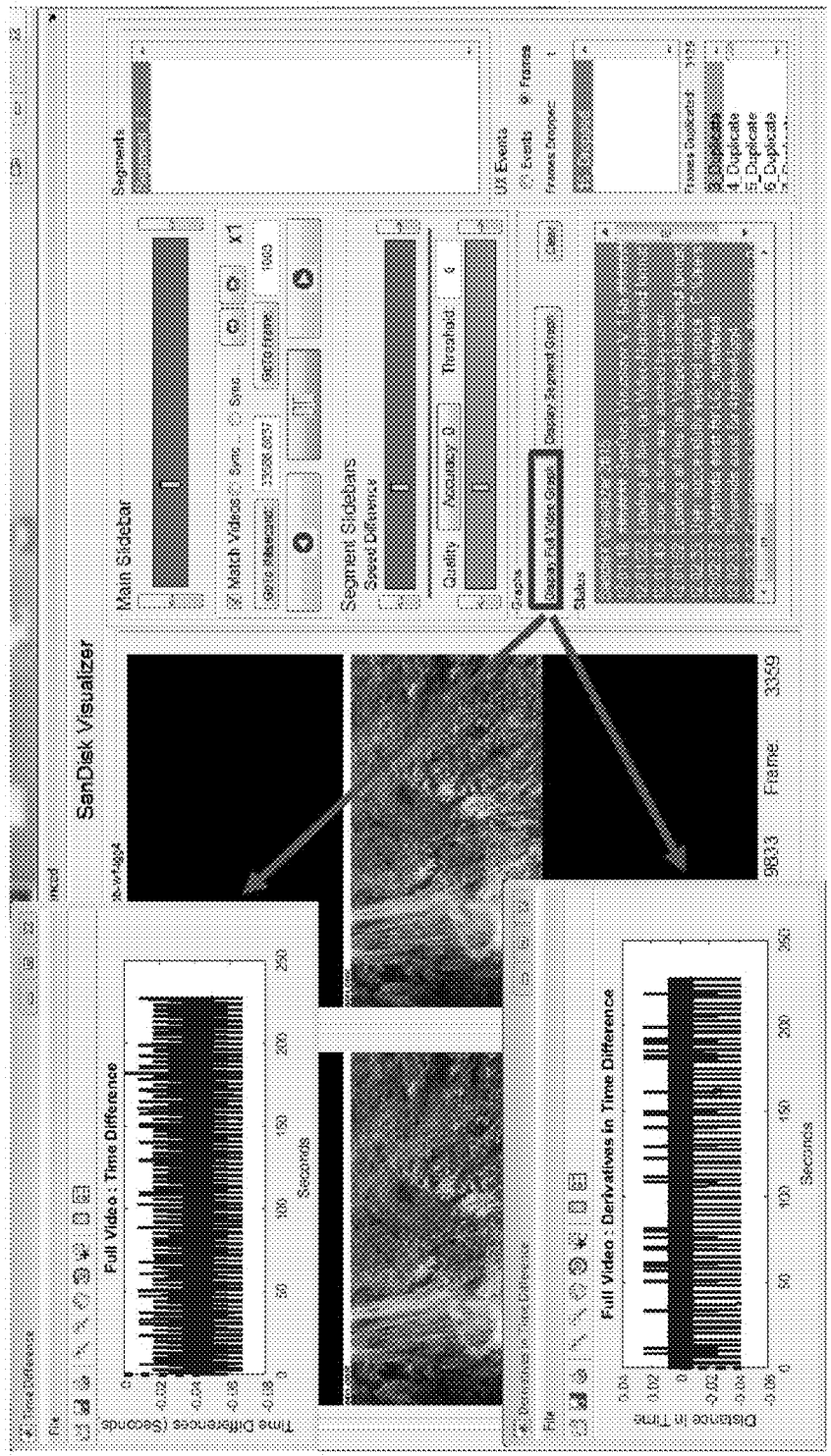
FIG. 21 is an illustration of a graphical user interface of a visualizer of an embodiment showing dropped frames.

FIG. 20 is a flowchart 2000 of a method that the visualizer 714 can implement in one embodiment. As shown in FIG. 20, the first step is to number the frames in a movie with the visualizer 714 (act 2010). Next, the numbered movie is copied to the mobile device 300 (e.g., a mobile phone) (act 2020). Then, the playback of the numbered movie is recorded (e.g., with an external camera or a recording app on the mobile device 300) (act 2030). The recorded video is then copied to the computing device 350 (act 2040). Then, the files are loaded into the visualizer 714: first, the original numbered image, and second the video from the mobile device 300 (act 2050). The visualizer 714 then runs a comparison test checking the dropped frames (act 2060) and analyzes the video and generates comparison graphs (act 2070). FIG. 21 is an illustration of a GUI of the visualizer 714 showing the comparison of two movies and resulting graphs of the dropped frame analysis.

Figure 22:
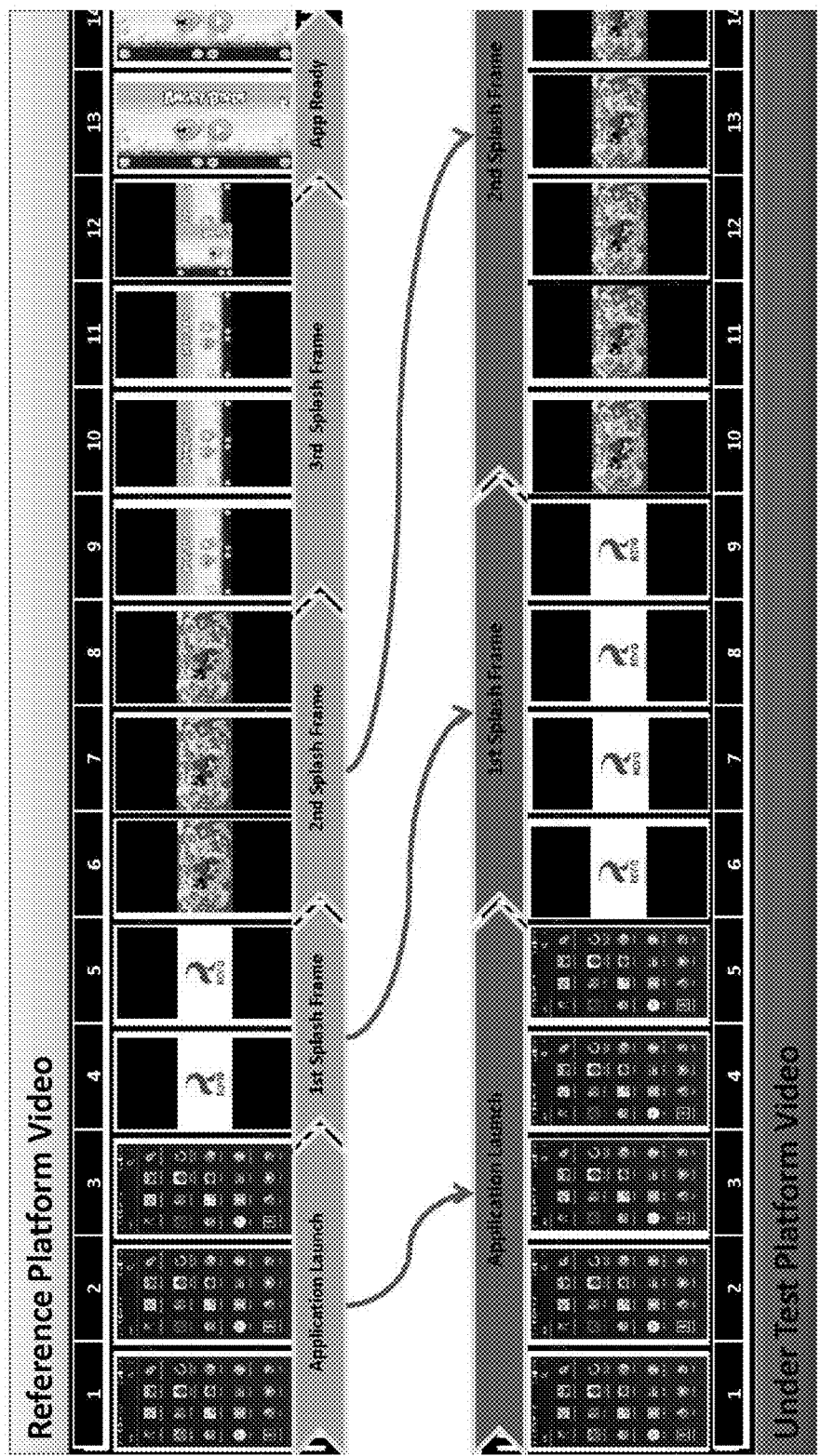
FIG. 22 is an illustration of a video under test and a reference video of an embodiment.

As also mentioned above, the visualizer 714 can be used to detect duplicate frames in an under-test video with respect to an original or reference video. As shown in FIG. 22, due so specific settings and characteristics in a mobile device, a video played back on the mobile device may have duplicate frames with respect to the reference video. For example, in the videos shown in FIG. 22, there are three frames for the application launch phase in the reference video, whereas there are five frames for that phase in the video under test. So, based on the comparison, there are three duplicates frames in the video under test with respect to the reference video.

Figure 23:
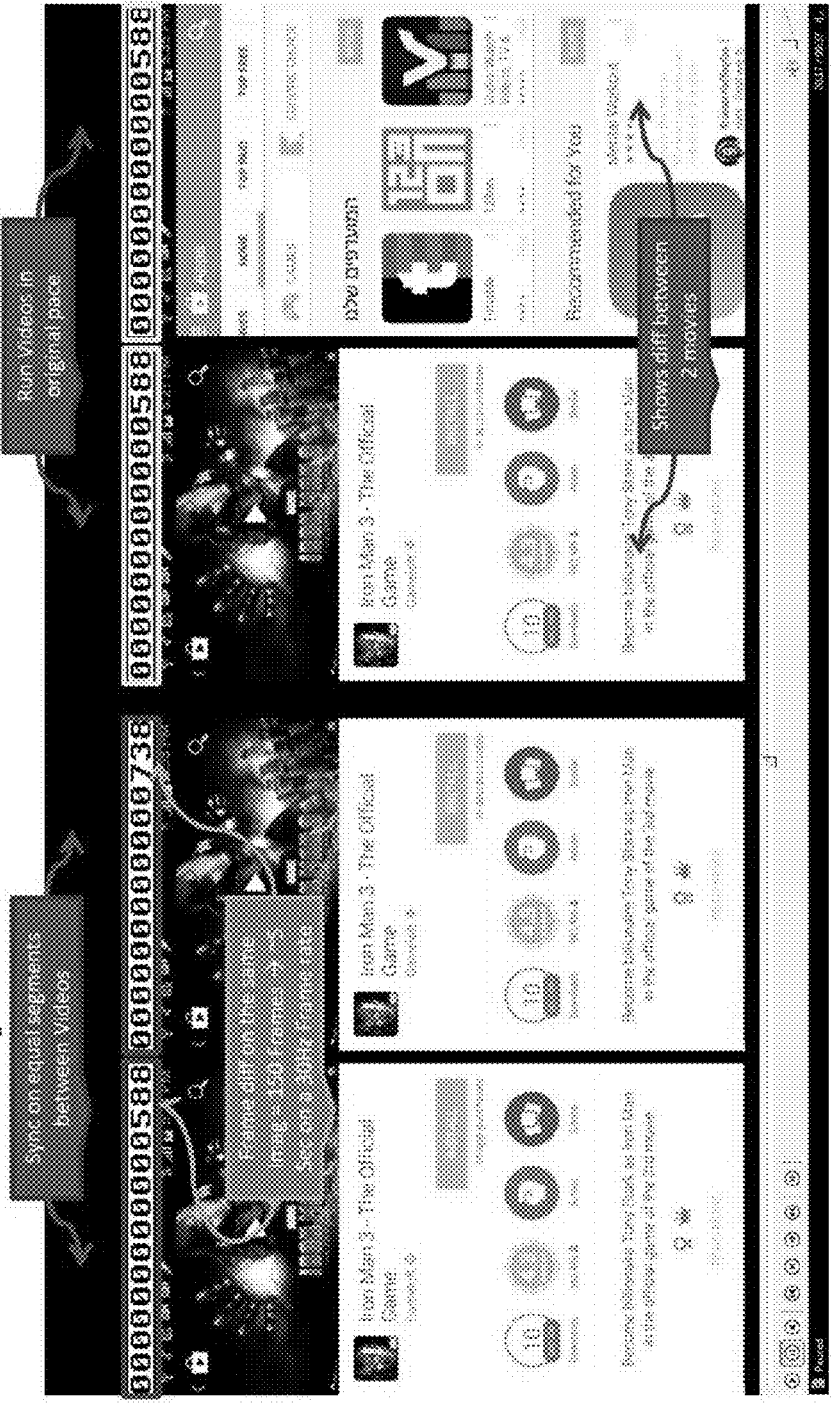
FIG. 23 is an illustration of a comparison of a video under test with a reference video of an embodiment.

The comparison can be done in any suitable way. For example, FIG. 23 shows two different video comparison methods. In the method on the left, the two videos are synced on equal segments between videos. In this example, this comparison shows that there is a frame difference of 150 frames, which is about five seconds when a 30 Hz frame rate is used. In contrast, the comparison on the right has the videos running at their original pace. So, the right dual videos are played from start to end regardless of content (the frame numbers on the top are identical), while the left dual videos are displayed using the above-described algorithm, so you can see the correlation in content (the frame numbers on the top are different).

In summary, the visualizer 714 can feature a dual video player that syncs two videos by content instead of time. Assuming both videos feature the same scenario, the visualizer 714 can correlate the display of the frames so both videos will show the same event regardless of the time gap. The visualizer 714 can generate a file (one for each video) with interactive graphs that have an indicator that is connected to the video player and shows the corresponding point of time on the graph (the frame seen on the player happened at the same time as the indicator on the graph).

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional exemplary structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

What is claimed is:

1. A method for analyzing user experience events, the method comprising:
   performing the following in a computing device in communication with a host device:
   (a) receiving a recorded video of a graphical user interface of the host device over a time period;
   (b) receiving data indicating activity of a first storage device used with the host device over the time period, wherein the data is synchronized with the recorded video;
   (c) comparing the recorded video with an image template to identify an image in the recorded video that indicates an occurrence of a pre-defined user experience events in the recorded video;
   (d) correlating the pre-defined user experience events with the data indicating activity of the first storage device over the time period, wherein the activity of the first storage device comprises one or more of the following: an input/output operation, processor utilization, memory usage, a kernel event, and an operating system event;
   (e) repeating (a)-(d) with a second storage device using the same host device parameters as used with the first storage device; and
   (f) generating an analysis of the correlations for the first and second storage devices to indicate what activity of the first and second storage devices occurred when the pre-defined user experience events occurred.

2. The method of claim 1, wherein the video of the graphical user interface of the host device is recorded using a camera external to the host device.

3. The method of claim 1, wherein the video of the graphical user interface of the host device is recorded using an application executing on the host device.

4. The method of claim 1, wherein the pre-defined user experience events is detected using an image processing algorithm.

5. The method of claim 1, wherein the analysis comprises at least one of a report and a graph.

6. The method of claim 1, wherein an application on the host device synchronizes the data indicating activity of the storage device with the recorded video by writing a time stamp indicating when recording of the video started into a log in a file containing the data indicating activity of the storage device.

7. The method of claim 1 further comprising filtering the recorded video to account for one or more of the following: video compression and quality degradation.

8. The method of claim 1, wherein the pre-defined user experience events relates to one or more of the following: an application launch/application ready, a photo album load, a screen swipe, a start/end of an application installation, and a start/end of a burst of photos.

9. The method of claim 1, wherein the first storage device comprises a three-dimensional memory.

10. A system comprising:
    an event detector configured to compare a recorded video with an image template to identify an image in the recorded video that indicates an occurrence of a pre-defined user experience events in the recorded video over a time period; and
    an analyzer configured to:
    correlate the user experience events with traces of activity of a first storage device in a host device over the time period, wherein the activity of the first storage device comprises one or more of the following: an input/output operation, processor utilization, memory usage, a kernel event, and an operating system event;
    correlate the user experience events with traces of activity of a second storage device in the host device over the time period using the same host device parameters as used with the first storage device; and
    generate an analysis of the correlations to indicate what activity of the first and second storage devices occurred when the pre-defined user experience event occurred.

11. The system of claim 10, wherein the video of the graphical user interface of the host device is recorded using a camera external to the host device.

12. The system of claim 10, wherein the video of the graphical user interface of the host device is recorded using an application executing on the host device.

13. The system of claim 10, wherein the event detector is further configured to use an image processing algorithm.

14. The system of claim 10, wherein the analysis comprises at least one of a report and a graph.

15. The system of claim 10, wherein an application on the host device is configured to synchronize the traces with the recorded video by writing a time stamp indicating when recording of the video started into a log in a trace file.

16. The system of claim 10, wherein the event detector is further configured to filter the recorded video to account for one or both of video compression and quality degradation.

17. The system of claim 10, wherein the user experience events relates to one or more of the following: an application launch/application ready, a photo album load, a screen swipe, a start/end of an application installation, and a start/end of a burst of photos.

18. The system of claim 10, wherein the first storage device comprises a three-dimensional memory.

19. A system comprising:
    means for
    (a) receiving a recorded video of a graphical user interface of a host device over a time period;

(b) receiving data indicating activity of a first storage device of the host device over the time period, wherein the data is synchronized with the recorded video;

(c) comparing the recorded video with an image template to identify an image in the recorded video that indicates an occurrence of a pre-defined user experience events in the recorded video;

(d) correlating the pre-defined user experience events with the data indicating activity of the first storage device over the time period, wherein the activity of the first storage device comprises one or more of the following: an input/output operation, processor utilization, memory usage, a kernel event, and an operating system event;

means for repeating (a)-(d) with a second storage device using the same host device parameters as used with the first storage device; and means for generating an analysis of the correlations for the first and second storage devices to indicate what activity of the first and second storage devices occurred when the pre-defined user experience events occurred.

20. The system of claim 19, wherein the first storage device comprises a three-dimensional memory.

* * * * *